United States Patent
Wyrobek et al.

(10) Patent No.: US 12,304,670 B2
(45) Date of Patent: May 20, 2025

(54) SYSTEMS FOR UNMANNED AERIAL VEHICLE DOCKING, STORAGE, AND LOADING

(71) Applicant: ZIPLINE INTERNATIONAL INC., South San Francisco, CA (US)

(72) Inventors: Keenan A. Wyrobek, South San Francisco, CA (US); Brendan D. Wade, South San Francisco, CA (US); Zoltan Laszlo, South San Francisco, CA (US); Brian Boomgaard, South San Francisco, CA (US); Joshua Liu, South San Francisco, CA (US); Gregoire Vandenbussche, South San Francisco, CA (US); Kevin Nalecz, South San Francisco, CA (US); Radhika Gurumurthy, South San Francisco, CA (US)

(73) Assignee: Zipline International Inc., South San Francisco, CA (US)

( * ) Notice: Subject to any disclaimer, the term of this patent is extended or adjusted under 35 U.S.C. 154(b) by 72 days.

(21) Appl. No.: 18/039,618

(22) PCT Filed: Dec. 1, 2021

(86) PCT No.: PCT/US2021/061384
§ 371 (c)(1),
(2) Date: May 31, 2023

(87) PCT Pub. No.: WO2022/154887
PCT Pub. Date: Jul. 21, 2022

(65) Prior Publication Data
US 2024/0017860 A1  Jan. 18, 2024

Related U.S. Application Data

(60) Provisional application No. 63/153,282, filed on Feb. 24, 2021, provisional application No. 63/153,203, (Continued)

(51) Int. Cl.
*B64U 80/25* (2023.01)
*B64F 1/222* (2024.01)
(Continued)

(52) U.S. Cl.
CPC ............. *B64U 70/99* (2023.01); *B64F 1/222* (2013.01); *B64U 70/97* (2023.01); *B64U 80/10* (2023.01);
(Continued)

(58) Field of Classification Search
CPC .................. B64U 70/97; B64U 9980/10; B64U 9980/20; B64U 9980/25; B64U 9980/40; B64U 9980/70
See application file for complete search history.

(56) References Cited

U.S. PATENT DOCUMENTS

| | | |
|---|---|---|
| 9,567,081 B1 | 2/2017 | Beckman et al. |
| 9,656,805 B1 | 5/2017 | Evans et al. |

(Continued)

FOREIGN PATENT DOCUMENTS

| | | |
|---|---|---|
| AU | 2019213466 A1 | 9/2020 |
| AU | 2020220083 A1 | 9/2020 |

(Continued)

OTHER PUBLICATIONS

International Search Report and Written Opinion dated May 18, 2022 in connection with International Patent Application No. PCT/US2022/017585, 13 pages.

(Continued)

*Primary Examiner* — Nicholas McFall
(74) *Attorney, Agent, or Firm* — Dorsey & Whitney LLP

(57) ABSTRACT

A docking system for unmanned aerial vehicles (UAVs) includes a docking housing that defines a docking compartment, and a docking assembly coupled to the docking housing and configured to suspend the UAV within the docking compartment. The docking assembly may include a guiding feature configured to receive a docking feature of the UAV and direct the UAV toward a first captured position. The docking assembly may further include an advancement assembly operatively coupled with the guiding feature and configured to move the UAV from the first captured position to a second docked position.

21 Claims, 14 Drawing Sheets

Related U.S. Application Data filed on Feb. 24, 2021, provisional application No. 63/120,621, filed on Dec. 2, 2020.

(51) Int. Cl.
  *B64U 70/97* (2023.01)
  *B64U 70/99* (2023.01)
  *B64U 80/10* (2023.01)
  *G05D 1/00* (2006.01)
  *B64U 101/64* (2023.01)

(52) U.S. Cl.
  CPC ............ *B64U 80/25* (2023.01); *G05D 1/104* (2013.01); *B60L 2200/10* (2013.01); *B64U 2101/64* (2023.01)

(56) References Cited

U.S. PATENT DOCUMENTS

| | | | |
|---|---|---|---|
| 10,112,712 | B1 | 10/2018 | Gentry et al. |
| 10,493,863 | B1 | 12/2019 | Thrun et al. |
| 10,647,427 | B2 | 5/2020 | Buchmueller |
| 2011/0024559 | A1* | 2/2011 | McGeer .................. B64F 1/12 244/110 F |
| 2016/0001883 | A1 | 1/2016 | Sanz et al. |
| 2017/0247109 | A1 | 8/2017 | Buchmueller et al. |
| 2018/0155021 | A1 | 6/2018 | Patterson et al. |
| 2019/0016476 | A1 | 1/2019 | Scherz |
| 2019/0193952 | A1* | 6/2019 | Zevenbergen ......... B64U 80/25 |
| 2019/0202563 | A1 | 7/2019 | Wiggerich |
| 2020/0115049 | A1 | 4/2020 | Nakamura et al. |
| 2020/0290752 | A1 | 9/2020 | Kolosiuk |
| 2020/0324902 | A1 | 10/2020 | Burgess et al. |
| 2020/0369382 | A1 | 11/2020 | Thrun et al. |
| 2021/0253242 | A1* | 8/2021 | Falk-Petersen ........ B64U 80/70 |
| 2022/0019247 | A1* | 1/2022 | Dayan .................... B64F 1/222 |
| 2024/0140629 | A1 | 5/2024 | Boomgaard et al. |

FOREIGN PATENT DOCUMENTS

| | | |
|---|---|---|
| CA | 3022382 A1 | 12/2017 |
| CA | 3044218 A1 | 1/2020 |
| WO | 2019241434 A1 | 12/2019 |
| WO | 2020032262 A1 | 2/2020 |
| WO | 2020210904 A1 | 10/2020 |
| WO | 2020234427 A1 | 11/2020 |

OTHER PUBLICATIONS

PCT/US2021/061384, International Search Report and Written Opinion, Oct. 5, 2022, 15 pages.

Extended European Search Report dated Oct. 17, 2024 in connection with European patent application No. 21920061.5, 12 pages.

Extended European Search Report dated Feb. 11, 2025 in connection with European patent application No. 22760361.0, 11 pages.

* cited by examiner

SYSTEMS FOR UNMANNED AERIAL VEHICLE DOCKING, STORAGE, AND LOADING

CROSS-REFERENCE TO RELATED APPLICATIONS

This application is a U.S. National Stage Application of International Patent Application No. PCT/US2021/061384, filed Dec. 1, 2021, which claims priority to U.S. Provisional Patent Application No. 63/120,621, filed Dec. 2, 2020, entitled "UNMANNED AERIAL VEHICLE DELIVERY SYSTEM," U.S. Provisional Patent Application No. 63/153,203, filed Feb. 24, 2021, entitled "AUTONOMOUS VEHICLE DELIVERY SYSTEM," and U.S. Provisional Patent Application No. 63/153,282, filed Feb. 24, 2021, entitled "AUTONOMOUS VEHICLE DELIVERY SYSTEM," each of which is incorporated by reference herein, in the entirety and for all purposes.

FIELD

The described examples relate generally to systems and assemblies that support the operation, storage, and loading of unmanned aerial vehicles.

BACKGROUND

Unmanned aerial vehicles (UAVs) are increasingly used as viable package delivery vehicles. UAVs take many forms, such as rotorcraft (e.g., helicopters, quadrotors, and so on) as well as fixed-wing aircraft. UAVs may also be configured for different degrees of autonomy and may have varying complexity. Packages may be loaded into a UAV for delivery at a drop location or other delivery site. Once the package(s) are delivered, the UAV may return to one or more loading locations to receive additional package(s). Conventional systems may be unsuited for landing, loading, and/or launching a UAV for package delivery, particularly at existing retail, commercial, and/or industrial locations. As such, there is a need for systems and techniques to permit the docking, storage, and loading of UAVs for package delivery.

SUMMARY

Examples of the present invention are directed to systems for unmanned aerial vehicle docking, storage, and loading.

In one example, a docking assembly for an unmanned aerial vehicle (UAV) is disclosed. The docking assembly includes a guiding feature configured to receive a docking feature of the UAV and direct the UAV toward a first captured position. The docking assembly further includes an advancement assembly operatively coupled with the guiding feature and configured to move the UAV from a first captured position to a second docked position.

In another example, the advancement assembly may be configured to move the UAV from the first captured position to the second docked position while the UAV is suspended from the docking assembly via the docking feature. In some cases, the docking assembly may further include a guide arm coupling the advancement assembly and the guiding feature. In this regard, the advancement assembly may be configured to move the guide arm and cause the guide arm to establish the UAV at the first captured position or the second docked position. The advancement assembly may further be configured to move the guide arm in one or both of linearly or rotationally and cause the UAV to transition from the first captured position to the second docked position.

In another example, the guiding feature may define an alignment feature to encourage lateral movement of the UAV toward the first captured position. In some cases, the alignment feature may define a tapered docking path along a length thereof.

In another example, the docking assembly further includes a charging assembly electrically coupled to a power source. In this regard, in the second docked position, the UAV may electrically couple to the charging assembly to charge the UAV.

In another example, the docking assembly may further include a thermal system configured to thermally couple with the UAV, when the UAV is in the second docked position.

In another example, the docking feature may define a single continuous region of contact between the UAV and the advancement assembly. Further, a mounting structure of the docking feature may be configured to mechanically couple the docking assembly to a top surface of an enclosure. In some cases, the advancement assembly may be configured such that the UAV is separated from walls of an enclosure in the second docked position.

In another example, a docking system for unmanned aerial vehicles is disclosed. The docking system includes a docking housing defining a docking compartment. The docking system further includes a docking assembly coupled to the docking housing and configured to suspend an unmanned aerial vehicle (UAV) within the docking compartment such that the UAV is spaced apart from one or more walls of the docking housing.

In another example, the docking housing may include a top wall, a bottom wall, a back wall, and two sidewalls. The top wall, the bottom wall, the back wall, and the two sidewalls may cooperate to define the docking compartment. In some cases, the docking assembly may further include a charging assembly electrically coupled to a power source and configured to electrically couple to the UAV to transfer power to the UAV. Additionally or alternatively, the docking assembly may include a thermal system configured to thermal couple with the UAV, when the UAV is in the second docked position, and transfer heat therebetween.

In another example, the docking assembly may further include an advancement assembly that defines a pathway through the docking housing to guide the UAV from a first captured position to a second docked position. The docking assembly may further include a guiding feature that defines an alignment path to encourage the UAV to engage with the advancement assembly and reach the first captured position. In this regard, a portion of the guiding feature may be movable relative to the docking housing linearly and/or rotationally. In some cases, the advancement assembly may include a carousel configured to rotationally advance the UAV between the first captured position and the second docked position.

In another example, the docking system may further include a loading duct extending from a bottom wall of the docking housing. The loading duct may be configured to receive accessories coupled to the UAV therein. Further, the docking housing may be configured to be secured to an external portion of a building.

In another example, a method to mount an unmanned aerial vehicle is disclosed. The method includes directing an unmanned aerial vehicle (UAV) towards a docking assembly. The method further includes securing the UAV to an enclosure using the docking assembly.

In another example, the method may further include influencing lateral movements of the UAV and encouraging the UAV to a first captured position. Additionally, the method may include advancing the UAV from the first captured position to a second docked position, rotationally and/or linearly. Additionally, the method may further include at least one of charging the UAV, or transferring heat between the UAV and an element associated with the enclosure.

In addition to the exemplary aspects and examples described above, further aspects and examples will become apparent by reference to the drawings and by study of the following description.

DETAILED DESCRIPTION

Figure 1:
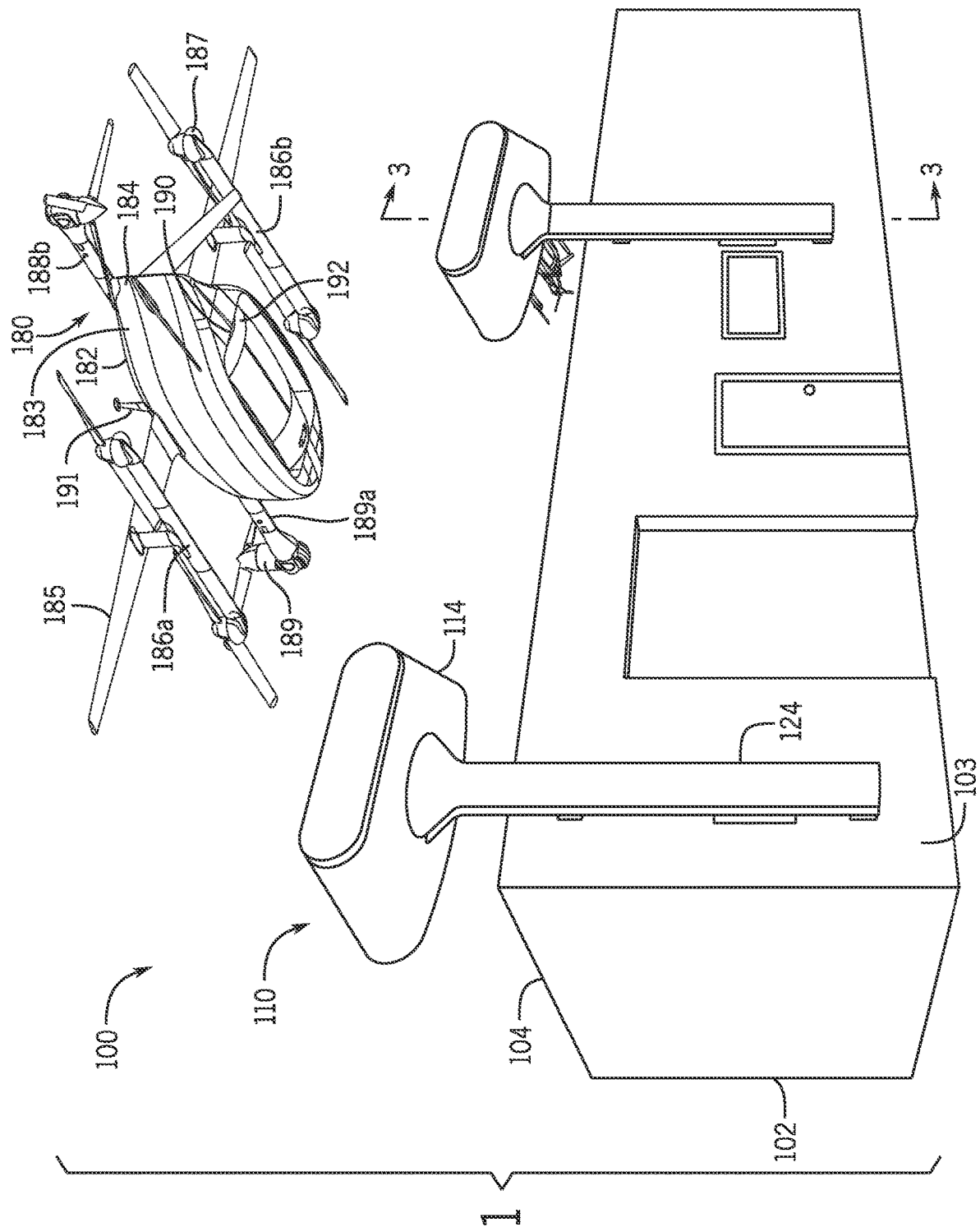
FIG. 1 depicts a system including an unmanned aerial vehicle (UAV) and a docking system.

The description that follows includes sample systems, methods, and apparatuses that embody various elements of the present disclosure. However, it should be understood that the described disclosure may be practiced in a variety of forms in addition to those described herein.

The following disclosure relates generally to systems for docking, storing, and loading unmanned aerial vehicles (UAVs). A UAV may include substantially any type of vehicle operated in an autonomous or semi-autonomous manner that is configured to carry and/or release a payload. In one example, a docking system may be coupled with a building and used to receive the UAV for loading and launching by the shipper. The docking system may include a docking housing having a top wall, a bottom wall, a back wall, and two sidewalls. The top wall, the bottom wall, the back wall, and the two sidewalls may cooperate to define a docking compartment for receiving the UAV. A tubular support element or assembly, which may optionally define a loading passage, may extend from the bottom wall and define a common internal passage with the docking compartment. The support assembly may be attached to side of a building and integrated therewith such that the an end of the common passage of the tubular support element is accessible from within the building.

The docking system may further include a docking assembly within the docking housing. The docking assembly may generally be configured to guide the UAV and transition the UAV from a first captured position to a second docked position. For example, the docking assembly may include one or more guiding features to encourage the UAV to progress towards a first captured position. At the first captured position, the UAV may be suspended from the docking assembly. The docking assembly may further include one or more advancement assemblies or associated systems that are configured to move the UAV from the first captured position to the second docked position. The movement of the UAV from the first captured position to the second docked position may occur linearly and/or rotationally, and while the UAV remains suspended from the docking assembly.

The docking assembly may be coupled to a docking housing in various manners such that the UAV may be suspended above a floor of the docking housing. This arrangement may assist in safety and docking, as compared to floor or sidewall docking locations as may be used in some UAV systems. Suspension of the UAV from the ceiling may also allow the UAV to lower and raise a payload, dependent UAV, and/or other feature into a chute below the UAV for receiving and loading in a building, which helps to ensure that the payload or package does not interfere or impact propeller movement, and ensure a clear pathway to a payload storage location within the UAV.

The docking assembly, in one example, may move the guiding feature relative to the docking housing linearly and/or rotationally via operation of the advancement assembly. For example, the advancement assembly may include a guide arm associated with a linearly advanceable track that operates to substantially linearly move the UAV from the first captured position to the second docked position. Additionally or alternatively, the advancement assembly may include a guide arm associated with a carousel to rotationally move the UAV from the first captured position to the second docked position. In the second docked position, the UAV may be positioned such that a payload held by the UAV is arranged generally above the common passage of the tubular support element. The UAV may therefore release the payload and cause the payload to be lowered through the common passage. The payload may be lowered through the common passage such that the payload is accessible from within the structure. The common passage may include guiding or access features that direct the payload into the structure. The payload may be modified, swapped, updated or the like and returned to the UAV via the common passage of the docking system. The UAV may be subsequently launched from the docking assembly for delivery of the payload to the delivery target.

The docking system may allow the UAV to be loaded and launched without constructing additional buildings or other infrastructure at a shipping location, which could otherwise be cost prohibitive. The docking system may further allow the UAV to land, load, and launch without loading the roof of existing infrastructure, which may otherwise not be rated for receiving additional loads and/or may not be accessible by a particular user or entity utilizing the UAV system. Further, the docking system allows for a standardized platform across shippers of various types and installation in various locations. The standardized platform may also facilitate modular construction or shipping capacity. For example, a shipper may add additional docking systems as needed to provide increased capacity. Additionally, a shipper may modularly expand or otherwise modify capacity by varying a length of a loading or access duct of the docking system. For example, and as described herein, the length may be varied or customized in order to allow the access duct to be loaded from multiple levels, and customized to meet the needs of the shipper, such as being arranged at a desired level of a slot or opening into the building. The standardized platform may also allow UAVs to be managed collectively across a region or other geographic boundary to return to a docking housing based on various factors to promote the efficient allocation of the UAV, including battery life, proximity, service criteria, anticipated deliveries, and so on.

Figure 3:
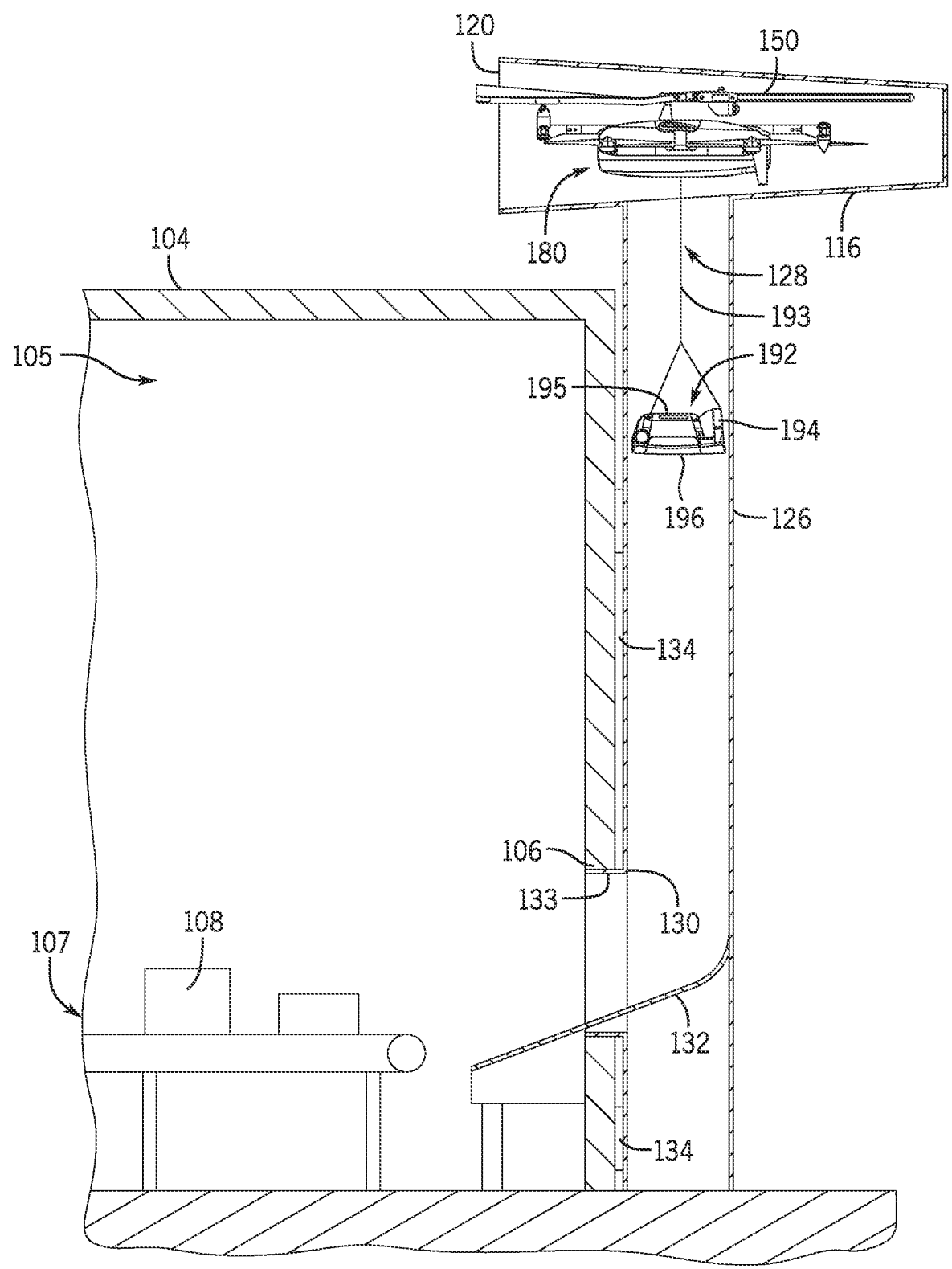
FIG. 3 depicts a cross-sectional view of the docking system and UAV of FIG. 1, taken along line 3-3 of FIG. 1.

Turning to the Drawings, FIG. 1 depicts a system 100 including an unmanned aerial vehicle (UAV) 180 and a docking system 110. The docking system 110 is configured to facilitate docking, storage, and loading of the UAV 180, for example, relative to a structure 102. The structure 102 may be a building associated with a retail, commercial, industrial, residential, and/or other location, such as where goods are sold and/or shipped. For example, the structure 102 may be a building housing a grocery store, a convenience store, and/or other type of retail location. In other cases, the structure 102 may be a distribution or fulfillment center. For purposes of illustration, the structure 102 is shown with sidewalls 103 and a roof 104. As described herein, the docking system 110 is configured for attachment to one or more of the sidewalls 103, which may mitigate excess loading on the roof 104. The structure 102 is further illustrated, as shown in FIG. 3, as including a building interior 105, a slot 106, staging equipment 107, and payloads 108. In a sample logistics or delivery operation, payloads 108 (e.g., goods to be delivered by the UAV 180) may be arranged at the staging equipment 107, such as a conveyor belt, table, bins, and so on, and passed through the slot 106 for retrieval by one or more assemblies or systems of the UAV 180 (e.g., for retrieval by a dependent UAV, where implemented). This may occur inside of the structure 102 at the building interior 105 so as to shield the logistics operation from external elements.

It will be appreciated that that the docking system 110 may be used with a variety of UAVs and UAV systems. For purposes of illustration, the UAV 180 is shown and described in FIGS. 1 and 3. The UAV 180 may include a primary UAV 182 and a dependent UAV 192. The primary UAV 182 may be configured to travel between a loading location (e.g., the structure 102) and a delivery location (e.g., a residential or commercial address). The dependent UAV 192 may be held or carried by the primary UAV 182. The dependent UAV 192 may be capable of carrying one or more of the payloads 108. The dependent UAV 192 may be deployable by the primary UAV 182. In one instance, this may allow the dependent UAV 192 to travel from the primary UAV 182 to adjacent a ground surface for dropping the payload at a delivery target. In another instance, this may allow the dependent UAV 192 to travel from the primary UAV 182 through a chute or other feature loading the dependent UAV 192 with a payload, such as using the docking system 110.

Figure 2:
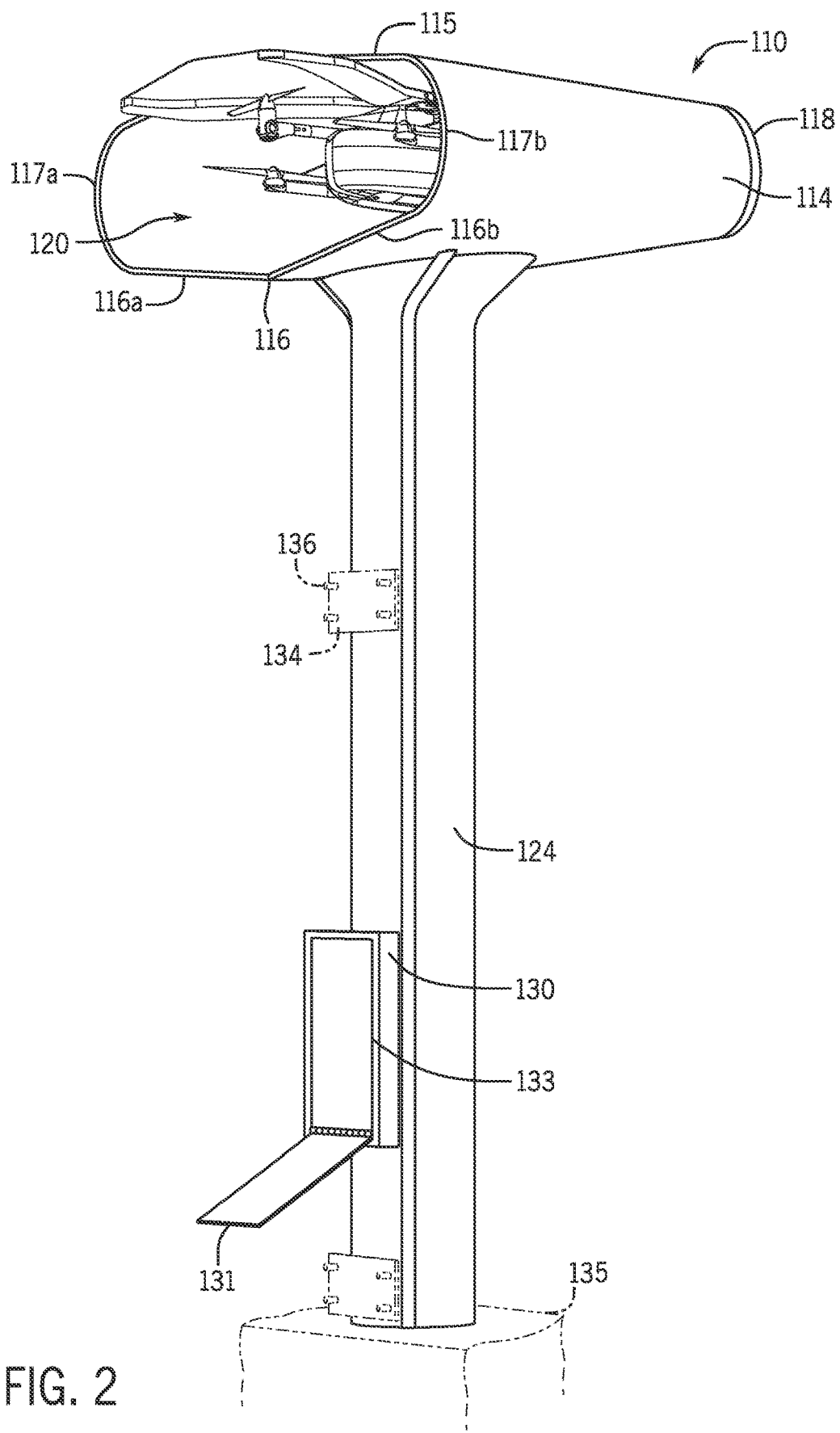
FIG. 2 depicts the docking system of FIG. 1 with a UAV received therein.

While the examples shown and described with respect to FIGS. 1-3 include the UAV 180 as having the primary UAV 182 and the dependent UAV 192, it will be appreciated that, in some cases, the dependent UAV 192 may be omitted. Where the dependent UAV 192 is omitted, the primary UAV 182 may be configured to hold a payload 108, such as in a bay or cargo hold of the primary UAV 182. In this regard, the primary UAV 182 may further be configured to raise and/or lower the payload as needed for storage, delivery, and/or loading. For example, the payload may be releasably coupled to a tether or other mechanical coupling that allows the payload to be raised and lowered by the UAV 182. It will therefore be appreciated that in the examples described herein, the docking system 110 and docking assembly 150, and associated assemblies and subassemblies, may be configured to land, load, and launch a UAV, primary UAV, and/or UAV system that does not necessarily include a dependent UAV. Further, the description with respect to loading of the dependent UAV may be applicable to a dumb or inactive payload, e.g., one without an independent drive or steering assembly.

In example shown in FIG. 1, the primary UAV 182 may include a combination fixed-wing and variable rotor propulsion system. For example, the primary UAV 182 may include a fuselage 183 and a primary UAV fixed wing 185 extending from the fuselage 183. Below the primary UAV fixed wing 185, side rotor supports 186a, 186b may extend along a generally perpendicular direction relative to the primary UAV fixed wing 185. At opposing ends of each of the side rotor supports 186a, 186b, side rotors 187 may be provided for a total a four side rotors 187. The side rotors 187 may rotate about an axis generally perpendicular with a ground surface. Extending from the fuselage 183 includes forward and back rotor supports 188a, 188b. Arranged at the respective ends of the forward and back rotor supports 188a, 188b are articulable rotors 189. The articulable rotors 189 may be configured to articulate between a generally horizontal and a generally vertical configuration, based on a configuration of the UAV 180 being in a hover or forward-flight mode. Extending from the back of the fuselage 183 is a tail 184. The tail 184 may be an inverted V-shaped feature, which may cooperate with the primary UAV fixed wing 185 to promote stability. The primary UAV 182 further includes a docking feature 191 arranged at a topmost portion of the fuselage 183. As described herein, the docking feature 191 may be used to define a single point of contact between the UAV 180 and the docking system 110. The fuselage 183 may further define a bay 190 along a lowermost portion of the primary UAV 182. The bay 190, as shown in FIG. 1, may be configured to receive and secure the dependent UAV 192 therein and/or may be configured to receive a payload, such as a package, within the bay 190.

The dependent UAV 192 or other payload may be coupled to the primary UAV 182 via a tether assembly 193 or other mechanical coupling. The tether assembly 193 may allow the dependent UAV 192 to be raised and lowered from the primary UAV 182 as needed, e.g., the UAV may include a motor that feeds and retracts the tether or other coupling to raise/lower the payload relative to the UAV. The dependent UAV 192 or other payload may include one or more thrusters 194 or separate, independent, drive mechanisms. The thrusters 194 may permit localized control of the movement of the dependent UAV 192, while the dependent UAV 192 remains coupled to the primary UAV 182, for example, via the tether assembly 193. In these instances, the tether assembly may work in conjunction with the drive assembly of the payload or dependent UAV to navigate the dependent UAV or payload into the primary UAV. In other embodiments, the dependent UAV and/or payload may remain off or deactivated during loading or unloading from the dependent UAV and the tether assembly may retract the payload on its own independent from any drive mechanism in the dependent UAV or payload.

The dependent UAV 192 may further include a loading cover 195 arranged at topmost surface of the dependent UAV 192. The loading cover 195 may be articulable to reveal a payload capacity of the dependent UAV 192 for receipt of payloads therein. Further, the dependent UAV 192 may include a delivery cover 196 arranged at a bottommost surface of the dependent UAV 192. The delivery cover 196 may be articulable to release the payload from the payload capacity of the dependent UAV 192.

With reference to FIG. 2, an isometric view of the docking system 110 is shown. The docking system 110 is shown in FIG. 2 separated from the structure 102 and with the UAV 180 received therein. The docking system 110 is shown in FIG. 2 as including a docking housing 114 and a support assembly or element 124. The docking housing 114 may broadly be configured to receive and dock or store a UAV, such as the UAV 180. The support assembly 124 may be configured to attach the docking system 110 to a structure, such as the structure 102. The support assembly 124 may further be configured to define a passage for a payload, including a payload carried by a dependent UAV, between the docking housing 114 and the structure 102.

The docking housing 114 is shown in FIG. 2 as including a top wall 115, a bottom wall 116, sidewalls 117a, 117b, and a back wall 118. The top wall 115, the bottom wall 116, the sidewalls 117a, 117b, and the back wall 118 may cooperate to define a docking compartment 120. The docking compartment 120 may have a size and shape sufficient to receive the UAV 180, such as being having a size and shape to complete cover the UAV 180. In the example shown in FIG. 2, the bottom wall 116 includes first and second bottom wall portions 116a, 116b, which are generally arranged in a V-shaped configuration. The bottom wall 116, sidewalls 117a, 117b, and back wall 118 may cooperate to define a generally tapered shape of the docking compartment 120. The tapered shape may support receiving and aligning the UAV 180 into the docking compartment 120, as well as allow for the docking system 110 to assume a small footprint relative to the associated structure. Other configurations, including other geometries of the docking housing 114, including those with more or fewer walls are contemplated herein, and may be constructed based on the size and the shape of the UAV 180.

The support assembly 124 is shown in FIGS. 2 and 3 as including a generally tubular structure 126 that defines a loading duct 128. The tubular structure 126 may be any appropriate shape and size in order to accommodate the needs of a shipper. For example, a length of the tubular structure 126 may be varied so that the tubular structure 126 spans a set distance between a window, slot or other access opening of the structure 102, and a region adjacent the building at which the UAVs are received by the docking system 110. Additionally, a length of the tubular structure 126 may be varied to expand or otherwise modify capacity of the shipper. For example, the tubular structure 126 may be modified to have a longer length such that the loading duct 128 of the tubular structure 124 may be accessed from multiple floors of the structure 102, as one example. The tubular structure 126 may be a structural component of the docking system 110 configured to couple the docking housing 114 to the structure 102. For example, the tubular structure 126 may extend from a the bottom wall 116 of the docking housing 114. The docking compartment 120 and the loading duct 128 may be connected internally to permit substantially unobstructed passage between the docking compartment 120 and the loading duct 128. Along an exterior of the tubular structure 126, the support assembly 124 may include one or more anchor component 134. The anchor component 134 may include plates having a collection of coupling features 136, such as bolts, that are configured to attached the tubular structure 126 to a building, including the structure 102 of FIG. 1. The anchor component 134 and coupling features 136 are shown in dashed line for purposes of illustration. For example, the anchor component 134 and/or the coupling feature 136 may be optional components and/or may be presented or arranged with the tubular structure 126 in another manner. Additionally or alternatively, other features and subassemblies may be used to secure the support assembly in relation to a building. For example, a concrete foundation 135 (shown in dashed line) may optionally be provided. The concrete foundation 135 may define a rigid base or mount for the tubular structure 126 adjacent a building, as may be required for a given application. In some cases, the concrete foundation 135, where used, may be integrated with and/or the same structure as a concrete foundation of an adjacent building. In other cases, the concrete foundation 135 may be a separate foundation, which may facilitate the attachment of the support assembly to an existing structure.

The support assembly 124 may further include one or more components to support integration of the docking system 100 with the structure 102. For example, as shown in FIGS. 2 and 3, the support assembly 124 may include an interface feature 130. The interface feature 130 may include a flange, rim, fitting or other component configured for engagement with the structure 102. For example, the interface feature 130 may be received into the slot 106 in order to define an common passage between the building interior 105 and the loading duct 128. Associated with the interface 130, the support assembly 124 is further shown as including an closing feature 131, a ramp 132, and a payload opening 133. For example, the interface feature 130 may define the opening 133 that extends into the loading duct 128. A ramp 132 or other guide may extend from with the loading duct 128 and through the interface 130 and the slot 106 in order to guide, for example, a payload (e.g., carried by the primary UAV 182 without the dependent UAV 192), the dependent UAV 192, or other element between the loading duct 128 and the building interior 105. The closing feature 131 may be a door or other element selectively closable to shield the building interior from the loading duct 128 when not in use.

The interface feature 130 may be configured to accommodate structures of various sizes in order to allow the docking system 110 to be customized to a particular structure/building and application. As one example, the interface feature 130 may be arranged along the tubular structure 126 at a distance from the docking compartment 120 to support the integration of the docking system 110 with the building. To illustrate, the interface feature 130 may be arranged such that the payload opening 133 is generally aligned with the slot 106 of the structure 102. The slot 106 may correspond to a window or other opening in a wall of the structure 102. In other examples, the slot 106 or window or opening may be at a different elevation in the structure 102, including being at a different floor relative to a roof region of the structure 102. In this regard, the interface feature 130 may be modified along the tubular structure 126 such that the payload opening 133 is generally aligned with the elevation of the slot 106. In some cases, multiple interface features 130 may be used with the tubular structure 126, for example, in order to provide access to the loading duct 128 from multiple levels within the structure 102.

It will be appreciated that the interface feature 130 may include different variations of the closing feature 131, the ramp 132, and the payload opening 133, based in part, on the type and purpose of the structure 102. As one example, a length of the ramp 132 may be lengthened or shortened based on the requirements of the structure 102 and proximity of the tubular structure 126 from a side wall of the structure 102. In some cases, the ramp 132 may extend into the building interior 105, such as that shown in FIG. 3, whereas in other cases the ramp 132 may terminate at or adjacent to the slot 106. As another example, the closing feature 131 may be omitted from the system, based on a frequency of use of the docking system 110 and/or climate differentials between the interior 105 and the external environment. The ramp 132, the closing feature 131, and other aspects of the interface feature 130 may also be varied based on a use and/or structural integrity of the structure 102. For example, where required, the interface 130 may be modified to attached directly to the structure 102 at the slot 106 in order to provide addition structural stability to the docking system 110.

Figure 4:
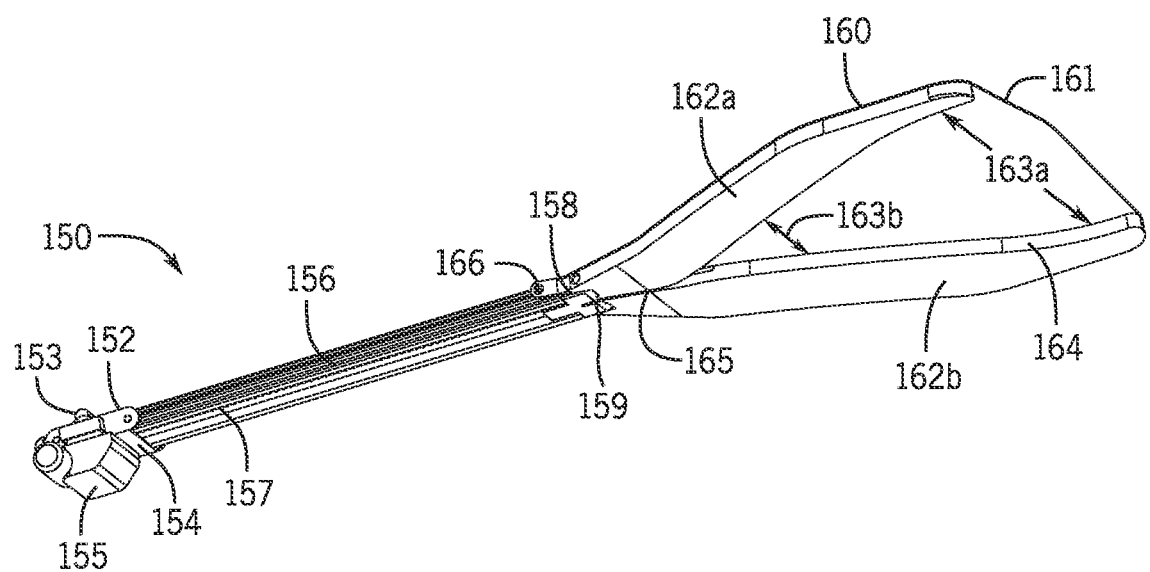
FIG. 4 depicts a docking assembly of the docking system of FIG. 1.

The docking system 110 may be configured to dock, store, and/or load the UAV 180 using a docking assembly 150, as shown in FIG. 4. For example, the docking assembly 150 may be coupled to the docking housing 114 and use to guide an approach of the UAV 180 into the docking housing 114. The docking assembly 150 may be further configured to secure and suspend the UAV 180 in the docking housing 114, and support other functions, such as charging the UAV 180.

FIG. 4 shows an example configuration of the docking assembly 150. The docking assembly 150 may include an advancement assembly 152, a guide arm 156, and a guiding feature 160. The guiding feature 160 shown in FIG. 4 may include a fan-shaped hood 161 having a first bumper 162a and a second bumper 162b connected to an underside of the hood 161. The first and second bumpers 162a, 162b may cooperate to define a tapered docking path along the underside of the hood 161. For example, the first and second bumpers 161a, 161b may define a tapered docking path between a first portion of the guiding feature having a first width 163a and a second portion having a second width 163b. The width of the docking path may narrow between the first and second portions such that the second width 163b is substantially less than the first width 163b. In this regard, as the UAV 180 advances along the docking path, as described herein, the UAV 180 is increasing constrained laterally, as a function of the width of the docking path. In this regard, the guiding feature 160 may define a funnel having a funnel portion 164 that gradually reduces the width of the docking path. The funnel portion 164 may lead to a linear advancement portion 165 at which the UAV 180 is substantially entirely constrained from lateral movement.

The guide arm 156, with continued referenced to FIG. 4, is shown as a generally elongated structure having a track or track feature 157. The track feature 157 may be a series of rails, grooves, ratcheted surfaces, teeth, and so on. The track feature 157 may permit engagement by a complimentary feature such that the guide arm 156 may be moved linearly. The guide arm 156 is further shown as including an engagement feature 158. The engagement feature 158 may be configured to couple the guide arm 156 to the guiding feature 160. In some cases, the engagement feature 158 may permit some degree of movement of the guiding feature 160 relative to the guide arm 156, such as a degree or range of relative pivoting movement. This may allow the guiding feature 160 to move slightly with movement of the UAV 180, while the guide arm 156 remains generally rigid. The guide arm 156 further includes a receiving guide 159. The receiving guide 159 may be a slot or groove configured to define a single point of contact between the UAV 180 and the docking system 110. For example, the receiving guide 159 may receive a feature of the UAV 180 and cause the UAV 180 to be suspended from the guide arm 156.

The advancement assembly 152 is shown in FIG. 4 as including a mounting structure 153, a track guide 154, and an advancement mechanism 155. The advancement assembly 152 may be operatively coupled with the guiding feature 160, such as via the guide arm 156, and generally operate to cause a transition of the UAV from the first captured position to the second docked position. With respect to the mounting structure 153, the advancement assembly 152 may include more or more anchors, fasteners, and/or other components that are configured to secure the docking assembly 150 within the docking system 110. The track guide 154 may include a housing or other feature configured to receive the guide arm 156. The track guide 154 may be fixedly connected to the mounting structure 153. The advancement mechanism 155 may include one more components that are configured to engage the track feature 157 and cause the linear advancement of the track feature 157 through the track guide 154. As one example, the advancement mechanism 155 may include a rotational motor and a series of gears, teeth, and other structures to engagement the track feature 157. The rotational motor may rotate and cause the associated teeth of the advancement mechanism 155 to rotate. In turn, the rotation of the teeth of the advancement mechanism 155 may cause the track feature 157 to advance, linearly, through the track guide 154. It will be appreciated that in other examples, other patterns of movement for the UAV in the docking assembly 150 are possible including rotational movement, as described herein at FIGS. 9-10B.

Figure 5A:
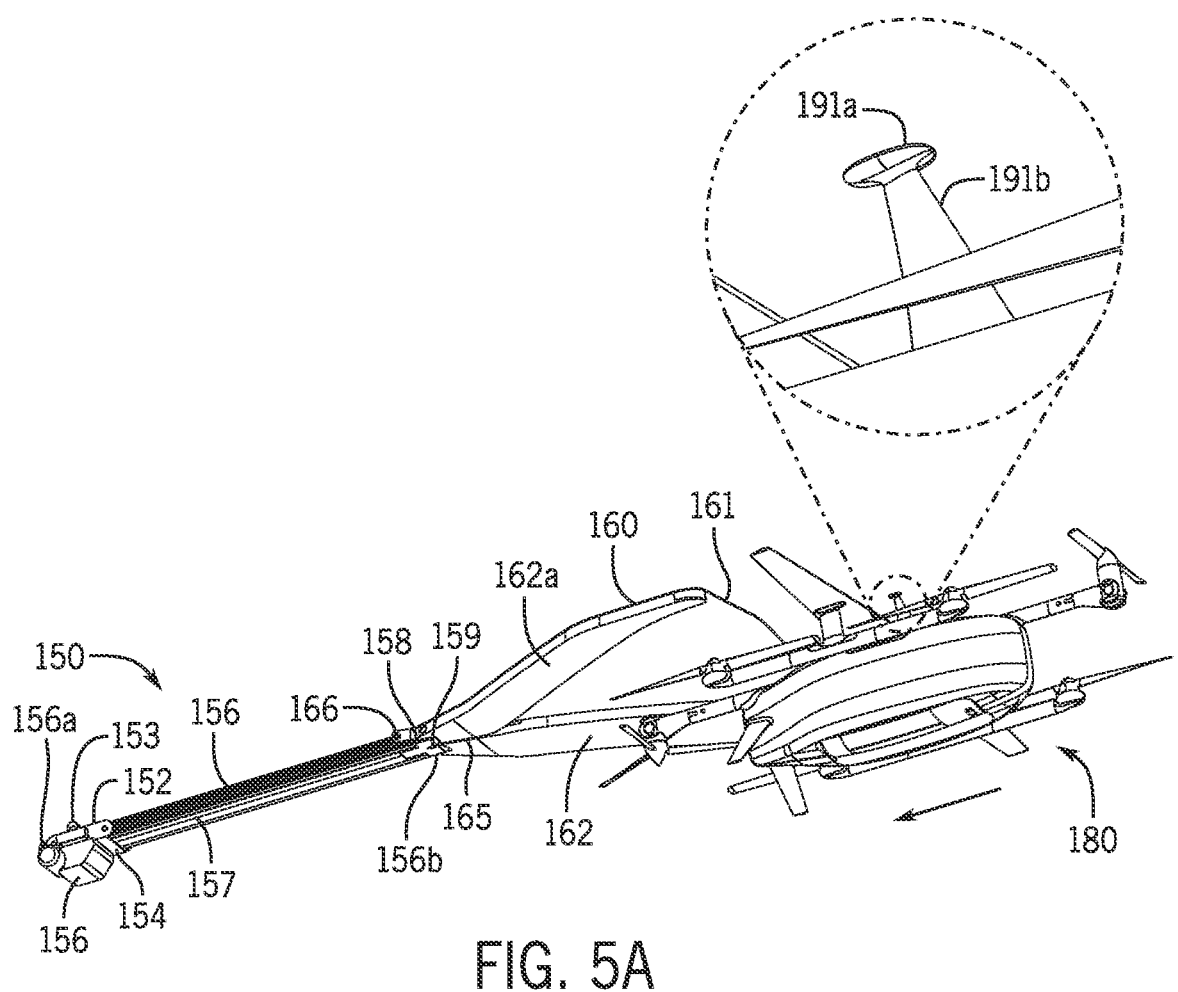
FIG. 5A depicts the docking assembly and the UAV of FIG. 1 in a first configuration.
Figure 5B:
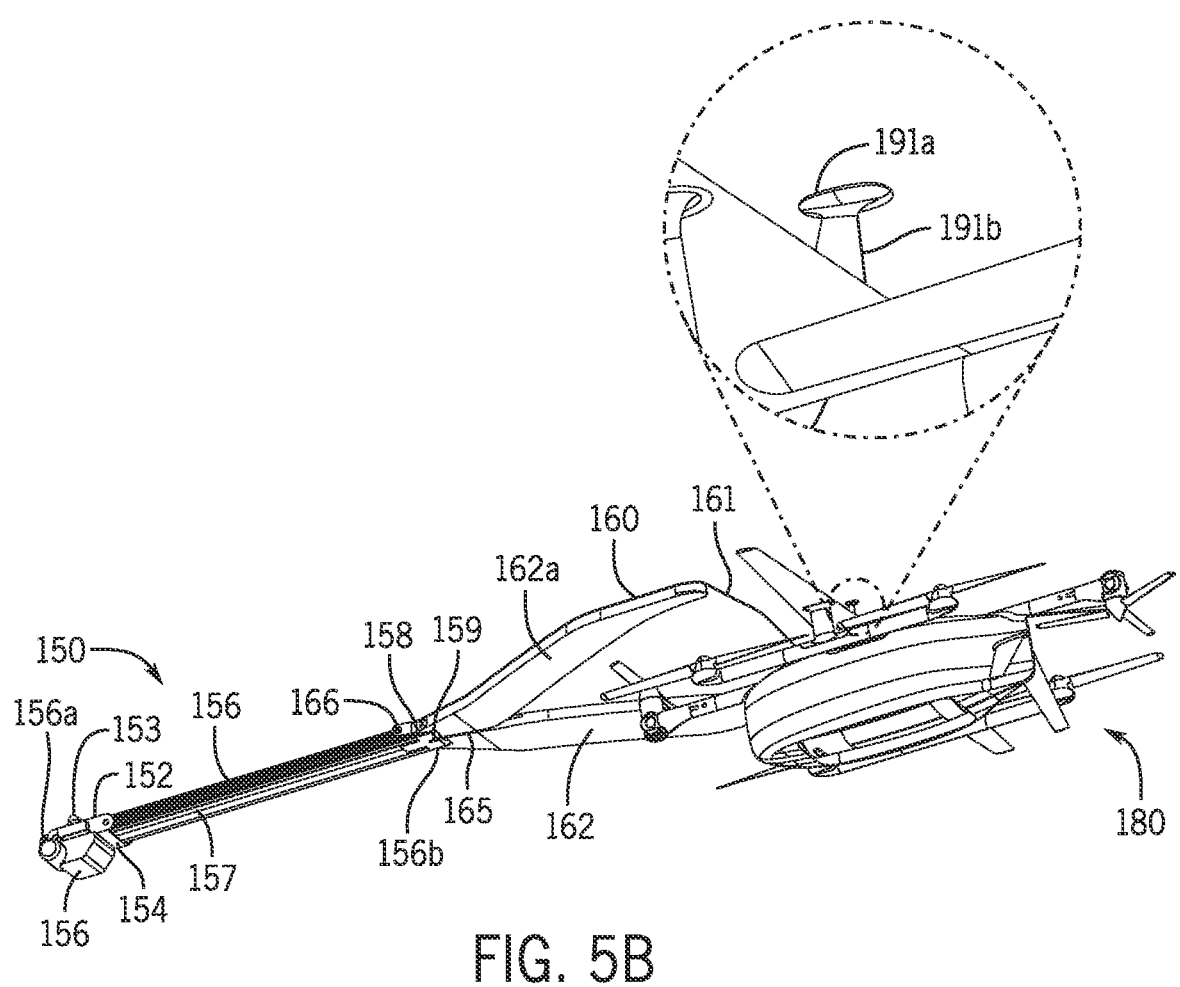
FIG. 5B depicts the docking assembly and the UAV of FIG. 1 in a second configuration.

FIGS. 5A-5F depict example operations of the docking assembly 150. For example, FIGS. 5A-5F show an operation of receiving and mounting an UAV, such as the UAV 180. With reference to FIG. 5A, the docking assembly 150 is shown in a first configuration in which the guide arm 156 is extended from the advancement assembly 152. For example, a first end 156a of the guide arm 156 may be generally arranged in or adjacent to the track guide 154. The UAV 180 may travel in a direction toward the guiding feature 160. For example, the UAV 180 may travel in a first direction toward the guide feature 160, as shown in FIG. 5A. The UAV 180 may also travel in a second, reverse direction, toward the guide feature 160, as shown in FIG. 5B. Additionally or alternatively, as contemplated herein, the UAV 180 may travel toward the guide feature 160 angularly offset from the first and second directions shown with reference to FIGS. 5A and 5B, and toward the guide feature 160 for receipt and capture thereby, as described herein. For example, the UAV 180 may travel toward the guide 160 such that the docking feature 191 of the primary UAV 182 is positioned along the docking path and between the bumpers 162a, 162b. As shown in the detail of FIG. 5A, the docking feature 191 may include a pedestal 191a and a mast 191b. The mast may extended from a topmost surface of the fuselage 183 and support the pedestal 191a above the fuselage 183. The UAV 180 may travel along the docking path such that the pedestal 191a is generally adjacent or contacting the underside of the hood 161 of the guiding feature 160. This may allow the pedestal 191a to be captured by the docking assembly 150. Capturing the pedestal 191a, or docking feature 191 more generally, may define the first docked position of the UAV 180. As shown in FIG. 5B and accompanying detail, the pedestal 191a and the mast 191b may also approach and enter the guide feature 160 substantially reversed from the orientation shown in FIG. 5A.

Figure 5C:
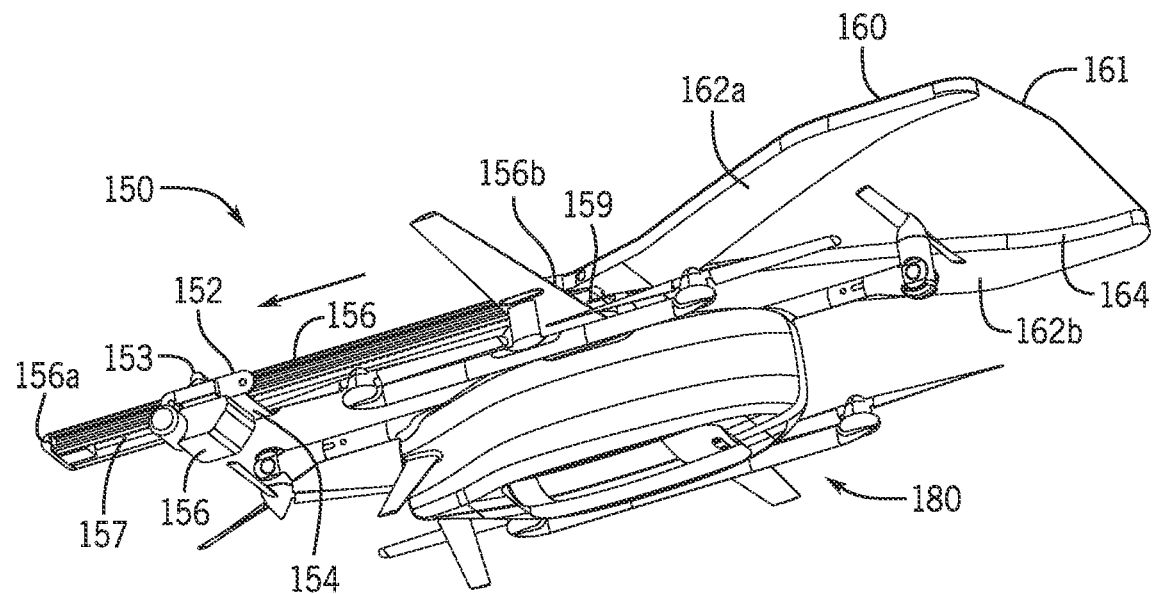
FIG. 5C depicts the docking assembly and the UAV of FIG. 1 in a third configuration.

In either orientation, and/or optionally other orientations, the pedestal 191a may be captured by the linear advancement portion 165 of the guiding feature 160, as shown in FIG. 5C. In some cases, the linear advancement portion 165 may include a lip, rail, ledge or other feature and the pedestal 191a may be positioned over the lip or related feature. The lip may then prevent vertical exit of the docking feature 191 in addition to the bumpers 162a, 162b progressively constraining lateral movement of the UAV 180. FIG. 5C further shows guide arm 156 being linearly advanced using the advancement assembly 152. For example, the advancement mechanism 155 may engage the track feature 157 and cause the guide arm 156 to move, linearly. In this regard, FIG. 5C shows the first end 156a exiting the advancement assembly 152 and the second end 156b advancement toward the advancement assembly 152.

Figure 5D:
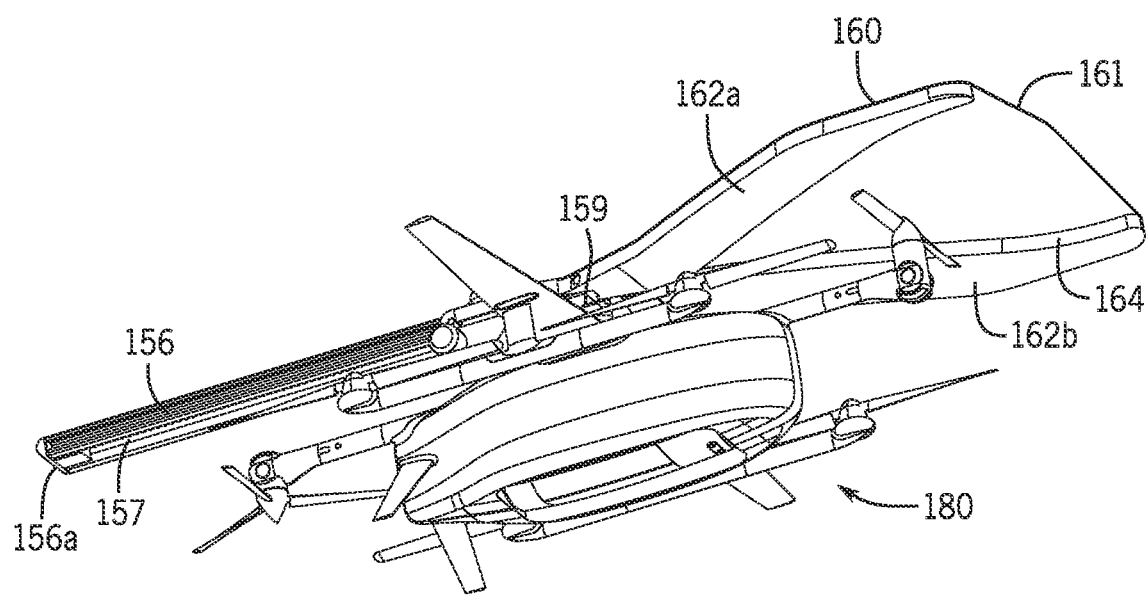
FIG. 5D depicts the docking assembly and the UAV of FIG. 1 in a fourth configuration.

The advancement assembly 152 may continue to advance the guide arm 156 until the second end 156b is generally in or adjacent to the advancement mechanism 155, as shown in FIG. 5D. In the configuration of FIG. 5D, the guide arm 156 may be fully retracted with the UAV 180 in the second docked position. In the second docked position of FIG. 5D, the UAV 180 may be secured and suspended from the docking assembly 150 for the loading of payloads.

Figure 5E:
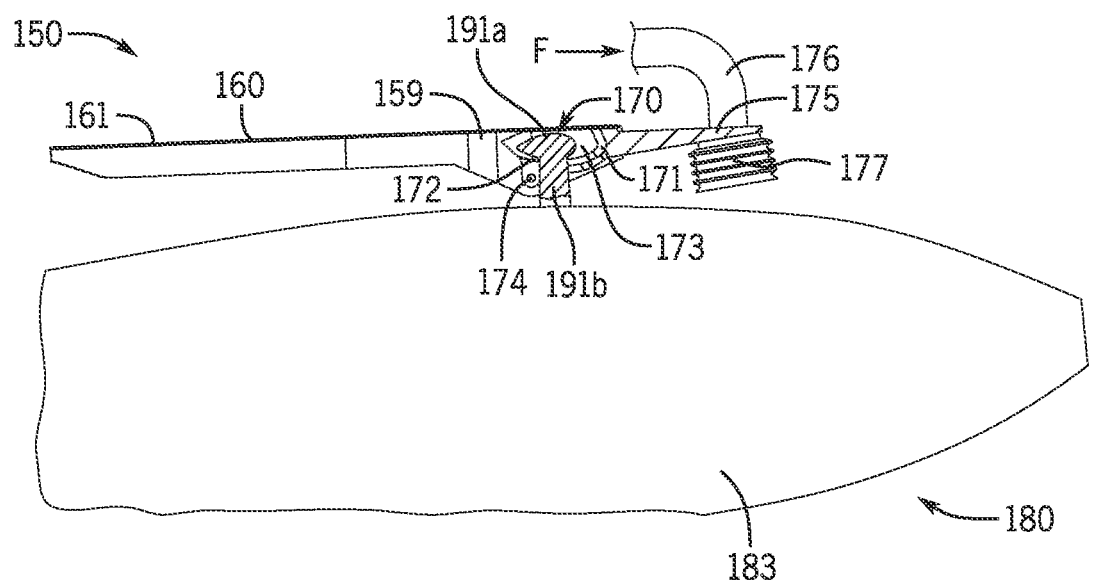
FIG. 5E depicts the docking assembly and the UAV of FIG. 1 in a first thermal configuration.
Figure 5F:
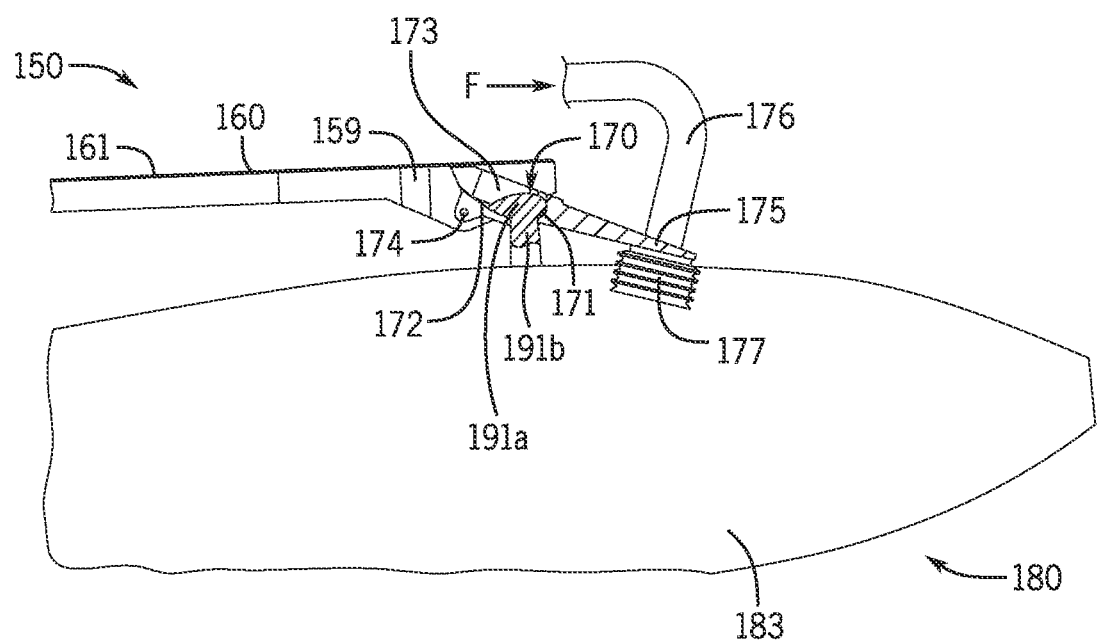
FIG. 5F depicts the docking assembly and the UAV of FIG. 1 in a second thermal configuration.

With reference to FIGS. 5E and 5F, thermal coupling operations of the docking assembly 150 and the UAV 180 are shown. Broadly, in the second, docked position, the docking assembly 150 may operate to thermally couple with, and transfer heat from, the UAV 180. In this regard, the docking assembly 150, may facilitate cooling of the UAV 180 when the UAV 180 is engaged with the docking assembly 150. FIGS. 5E and 5F show example cross-sectional views of the docking assembly 150 and the UAV 180, such as that shown and described with reference to FIGS. 5A-5D.

As shown in FIGS. 5E and 5F, the docking assembly 150 may include a coupling mechanism 170. The coupling mechanism 170 may generally be coupled with the guiding feature 160, for example, at the end of the receiving guide 159. The coupling mechanism 170 may include a cradle 171 that defines a cradle cavity 173 and a cradle opening 172 that extends into the cradle cavity 173. The cradle opening 172 may be configured to receive some or all of the docking feature 191, such as the pedestal 191a and/or some or all of the mast 191b. The cradle cavity 173 may be larger than the cradle opening 172 and define a seat or stop for any docking feature received therein. In one example, the cradle 171 may be pivotally coupled to the guide feature 160 at a rotational joint 174. The rotational joint 174 may include a pivot or hinge that allows the cradle 171 to rotate relative to the guiding feature 160. In some cases, the rotational joint 174 may include a spring bias or other feature that causes the cradle 171 to maintain an aligned position relative to the guiding feature 160, as shown in FIG. 5E. The coupling mechanism 170 may further include a platform 175. The platform 175 may extend from, and be rigidly coupled with, the cradle 171. In this regard, a pivot or rotation of the cradle 171 may cause a corresponding movement of the platform 175. The coupling mechanism 170 may further include one or more conduits 176. The conduit 176 may include hosing, tubing, and/or other fluid carrier that is adapted to route a fluid flow F forward the UAV 180, as shown in FIGS. 5E and 5F. The conduit 176 may be connected to the platform such that movement of the platform 175 causes a corresponding movement of the conduit 176. The conduit 176 may be elastically deformable. As further shown in FIGS. 5E and 5F, a thermal engagement feature 177 is provided. The thermal engagement feature 177 may include a bellows and/or other optionally deformable or compressible material that is configured to engage a fuselage of a UAV.

In operation, as shown in FIG. 5E, the UAV 180 may reach the second, docked position. For example, the docking feature 190 may travel along the receiving guide 159 and enter the cradle cavity 173 via the cradle opening 172. The docking feature 190 may enter the cradle cavity 173 with the platform 175 substantially aligned with the hood 161. With the platform 175 substantially aligned with the hood 161, the thermal engagement feature 177 may generally be offset from the fuselage 183 of the UAV 180. The UAV 180 may continue forward motion into the cradle 171 until the docking feature 190, such as the pedestal 191a, reaches a wall or a seat of the cradle 171 within the cradle cavity 173. Next, the UAV 180 may power-off, such as ceasing to operate one or more of the rotors of the UAV 180. As the UAV 180 powers-off, the docking feature 190 may land in the cradle 171, as shown in FIG. 5F. The landing of the docking feature 190 into the cradle 171 may cause the cradle 171 to pivot relative to the guiding feature 160, for example, using the rotational joint 174. In some cases, the cradle 171 may rotate down (e.g., clockwise) by around 20 degrees. The cradle 171 may rotate downward until the thermal engagement feature 177 contacts, or is otherwise adjacent to, including being slightly offset from, the fuselage 183. In the configuration of FIG. 5F, fluid flow F, including cooled air, may be advanced to the fuselage 183 to facilitate cooling of the UAV 180. It will be appreciated that the operation of FIGS. 5E and 5F may be reserved upon powering up of the UAV 180. For example, upon powering up the rotors of the UAV 180, the docking assembly 190 may cease to rest on the wall of the cradle 171, and thereby allow the cradle to return to the configuration of FIG. 5E with the thermal engagement feature offset from the fuselage 183.

The operation described with reference to FIG. 5A-5F may occur within or substantially within the docking housing 114. As one example, and with reference to FIG. 3, the docking assembly 150 may be received within the docking compartment 120 of the docking housing 114. The mounting structure 153 or other component may be fixedly attached to the docking housing 114. For example, the mounting structure 153 may secure the docking assembly 150 an underside of the top wall 115. In this regard, the docking assembly 150 may be configured to suspend the UAV 180 in the docking compartment 120 and in a manner spaced apart from the top wall 115, the bottom wall 116, the back wall 118, and the sidewalls 117a, 117b.

In the configuration shown in FIG. 5A, the docking assembly 150 may extend partially outside of the docking compartment 120. For example, the docking assembly 150 may remain fixed to the docking housing 114 via the mounting structure 153 while the guide arm 156 and the guiding feature 160 is extended outside of the docking compartment 120. As the UAV travels toward the guiding feature 160 and is secured therein, the docking assembly 150 may retract the guide arm 156 such that the guide arm 156 and the guiding feature, and the UAV 180, are received within the docking housing 114. The docking assembly 150 may retract the guide arm 156 fully to a position in which the UAV 180 is generally positioned directly above the loading duct 128.

In operation above the loading duct 128, the primary UAV 182 may cause the release of a payload. For example, the primary UAV 182 may include a tethered payload, which does not include independent controls, thrusters, and the like. As such, the primary UAV 182 may operate to lower and raise the payload absent assistance from the payload. The packaging may be manipulated, swapped, or otherwise changed to include one of the payloads 108 of the staging equipment 107. In turn, the primary UAV 182 may cause the payload 108 to be similarly raised up through the loading duct 128. In other cases, the payload may be carried by the dependent UAV 192. For example, the primary UAV 182 may lower the dependent UAV 192 through the loading duct 128. The primary UAV 182 may lower the dependent UAV 192 until the dependent UAV 192 reaches the end of the loading duct 128 and is guided into the building interior 105, as shown in FIG. 3. The dependent UAV 192 may be loaded with payloads 108 of various types via the loading cover 195. When loading is complete, the primary UAV 182 may cause the dependent UAV 192 to be returned to the primary UAV 182 and secured therein.

It will be appreciated that the operation of the docking assembly 150 shown and described with respect to FIGS. 5A-5F may performed in reverse order to launch the UAV 180 from the docking system 110. For example, the advancement assembly 152 may operate to move the UAV 180 and transition from the second docked position to the first captured position, at which the UAV 180 may be released for subsequent flight. In one example, the advancement assembly 152 may move the guide arm 156 from the position shown in FIG. 5C, in which the second end 156b is in or adjacent the track guide 154. The advancement assembly 152 may move the guide arm 156 such that the guide arm 156 is extended, as shown in FIG. 5A, with the first end 156a within or adjacent the track guide 154. In the extended configuration of the guide arm 156, the UAV 180 may carry out one or more operations in order to move from the guide arm 156. For example, the UAV 180 may operate various rotors in order to move from the receiving guide 159 and away from the guide arm 156 via the guiding feature 160. The UAV 180 may move away from the guiding feature 160 and commence a flying operation. The UAV 180 in this configuration may be loaded with a payload. Accordingly, the UAV 180 may launch from the docking system 110 with the payload for delivery to a customer. The configuration of the docking assembly 150 may support the launching of the UAV 180. As one illustration, the docking assembly 150, via the guide arm 156, may move into the extended configuration in order to allow the UAV 180 to launch from the docking assembly 150. In turn, in the extended configuration, the UAV 180 may be positioned at least partially away from the docking compartment 120. As the UAV 180 is moved further away from the docking compartment 120, the UAV 180 may power up the rotors and other systems. In this regard the UAV 180 may be launched from the docking system 150 at full or substantially full power, which may not otherwise be possible at a position of the UAV fully within the docking compartment 120.

Figure 6A:
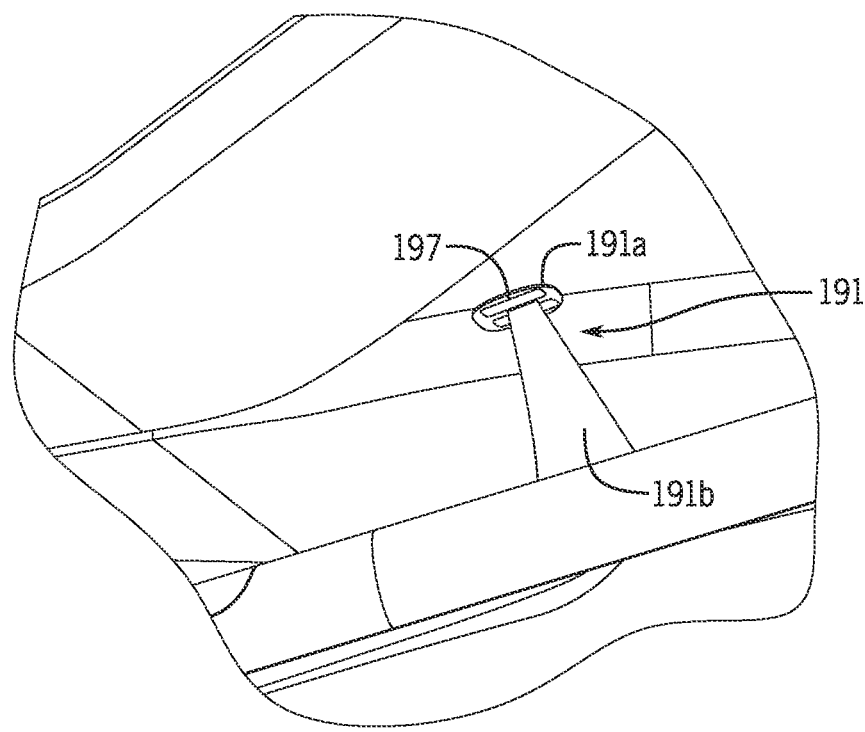
FIG. 6A depicts an example electrical coupling of the docking assembly and the UAV of FIG. 1.
Figure 6B:
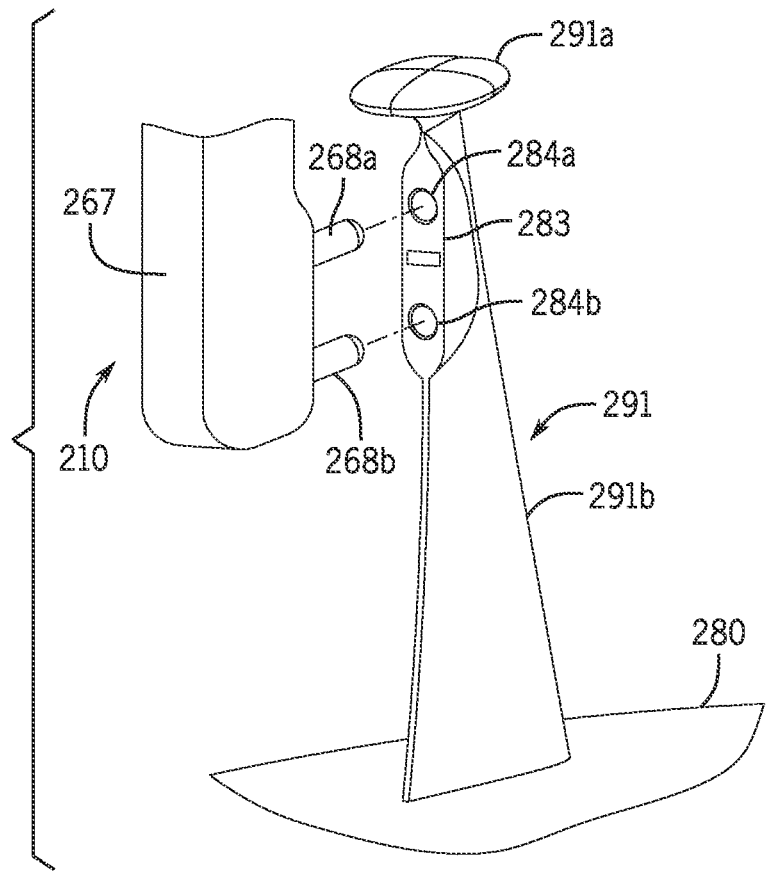
FIG. 6B depicts another example electrical coupling of the docking assembly and the UAV of FIG. 1.
Figure 6C:
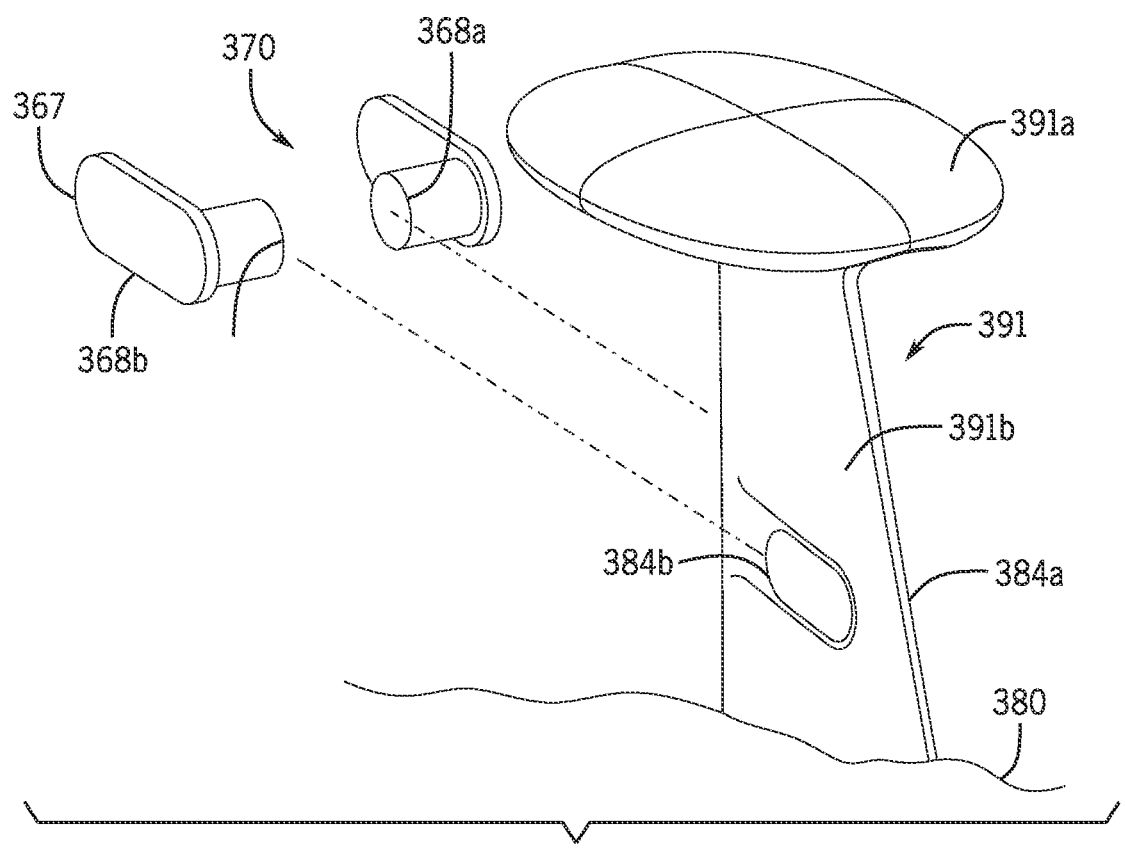
FIG. 6C depicts another example electrical coupling of the docking assembly and the UAV of FIG. 1.

In example implementation, the docking system 110 may allow the UAV 180 to charge while in a docked position. With reference to FIGS. 6A-6C, example configurations are shown in which a UAV may be electrically and/or thermally coupled with the docking system 110 in order to receiving an electrical charge and/or exchange heat in the second docked position and/or other configuration. As shown in FIG. 6A, the docking feature 191 may include the pedestal 191a and the mast 191b, as described herein. The pedestal may include charging leads 197. The charging leads 197 may be metal or conductive elements and/or other features that are adapted to receive an electrical charge or inductive current from an external source. In the example of FIG. 6A, the docking assembly 150 may further include charging connects arranged within the docking assembly 150. The charging connects may be arranged in the docking assembly 150 such that the charging connects 167 are in close physical proximity to the charging leads 197 when the UAV 180 is in the docked position. The charging connects may be connected to a power source of the docking system 110, for example, such as a common power source used to also cause the advancement of the guide arm 156. In this regard the docking system 110 may provide power to the UAV 180 via charging leads 197.

In another example, FIG. 6B shows a UAV 280 as having a docking feature 291, including a pedestal 291a and a mast 291b. In the example of FIG. 6B, a charging platform 283 is provided on the mast 291b. The charging platform 283 may include a first socket 284a and a second socket 284b. The first and second sockets 284a, 284b may be configured to receive electrical components of a docking system in order to charge the UAV 280. For example, a docking system 210 may include a UAV mount 267 including a first charging connect 268a and a second charging connect 268b. When the UAV 280 is in a mounting position, as described above with respect to the UAV 180, the first socket 284a may be electrically coupled with the first charging connect 268a and the second socket 284b may be electrically coupled with the second charging connect 268b. The electrical coupling of the first socket 284a and the first charging connect 268a and the second socket 284b and the second charging connect 268b may allow the UAV 280 to be charged by a power source of the docking system 210.

In another example, FIG. 6C shows a UAV 380 as having a docking feature 391, including a pedestal 391a and a mast 319b. In the example of FIG. 6C, a first charging pad 384a and a second charging pad 384b is provided on the mast 391b. The first and second charging pads 384a, 384b may be configured to receive electrical components of a docking system in order to charge the UAV 380. For example, a docking system 310 may include a UAV mount 367 including a first charging connect 368a and a second charging connect 368b. When the UAV 380 is in a mounting position, as described above with respect to the UAV 380, the first charging pad 384a may be electrically coupled with the first charging connect 368a and the second charging pad 384b may be electrically coupled with the second charging connect 368b. The electrical coupling of the first charging pad 384a and the first charging connect 368a and the second charging pad 384b and the second charging connect 368b may allow the UAV 380 to be charged by a power source of the docking system 310.

Figure 7:
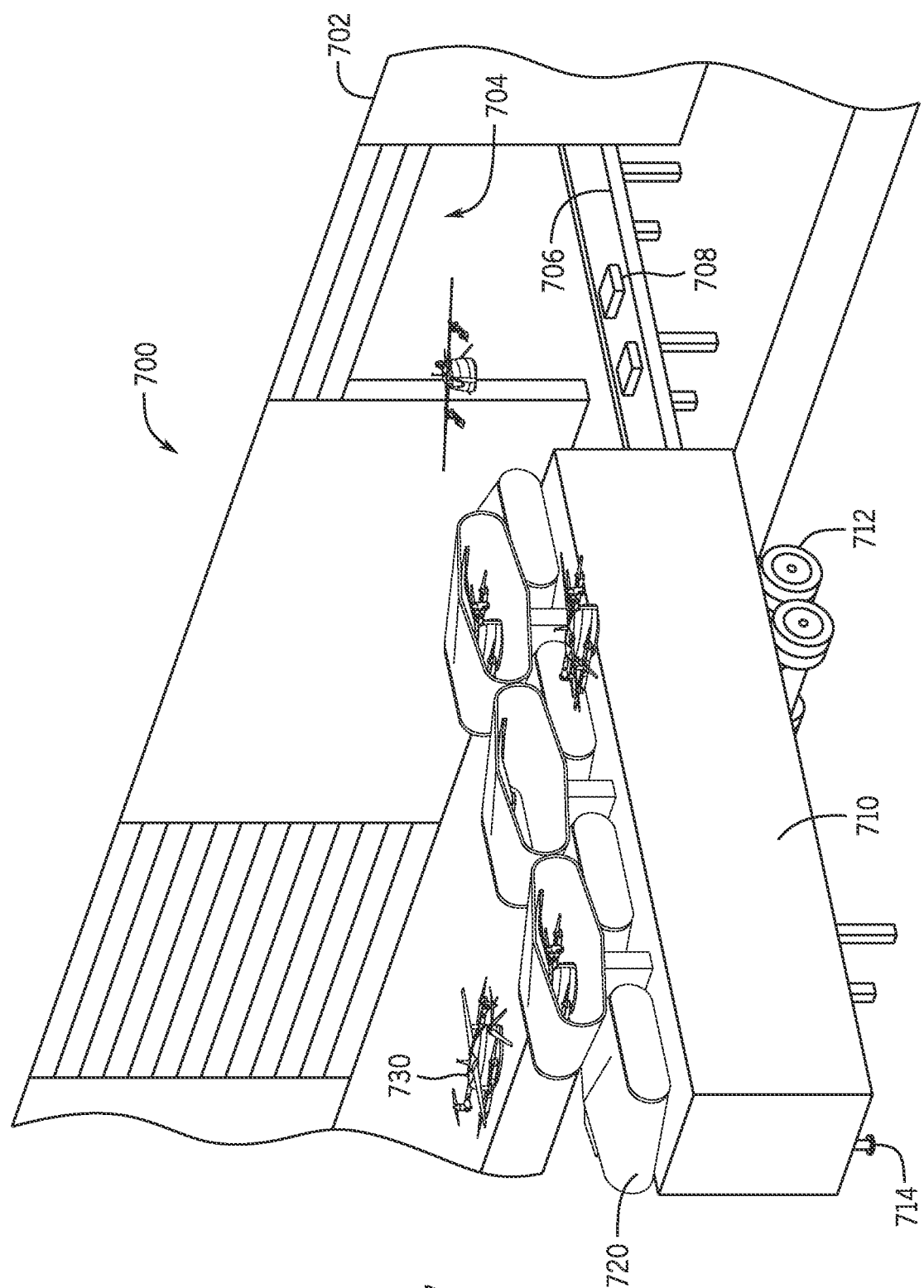
FIG. 7 depicts another example docking system.

The docking systems described herein may be implemented with a building or structure, such as the structure 102 described above. Other implementations are contemplated, including those in which multiple docking systems are integrated together in a substantially high-volume or high through-put operation. To illustrate, FIG. 7 shows a system 700. The system 700 includes a plurality of docking system 720 integrated with a mobile unit 710. The docking system 720 may be substantially analogous to the docking system 110; redundant explanation of which is omitted for clarity. In one example, the mobile unit 710 may be a tractor-trailer, including wheels 712 and a hitch 714, for example, for moving or transport. In other cases, the mobile unit 710 may include vehicles, shipping containers, storage pods, and so on. In the example of FIG. 7, the mobile unit 710 and plurality of docking system 720 may be associated with a distribution center 702. The distribution center 702 may be a structure, such as a warehouse, in which a packages and payloads are prepared to delivery to a customer base, such as a surrounding region. The distribution center 702 is shown in FIG. 7 as having a logistics assembly 706 (e.g., a conveyor below) advancing payloads 708 to the mobile unit 710 from an inside region 704 of the distribution center 702.

The mobile unit 710 includes a plurality of docking systems 720 in order to allow for multiple UAVs 730 to be docked, stored and/or loaded simultaneously or in rapid succession. In the example of FIG. 7, seven such docking systems 720 are provide with the mobile unit 710. As such, seven UAVs 730 may be docked, stored and/or loaded, for example, with the payloads 708 advancing from the logistics assembly 706. The payloads 708 can be loaded in rapid succession using the system of FIG. 7. The mobile unit 710 further allows for on-demand adjustment of delivery capacity at the distribution center 702. For example, the distribution center 702 may typically use a single mobile unit 710 or other portable storage compartment or vehicle, and during peak seasons, use additional mobile trailers to rapidly expand delivery capacity, as needed.

Figure 8:
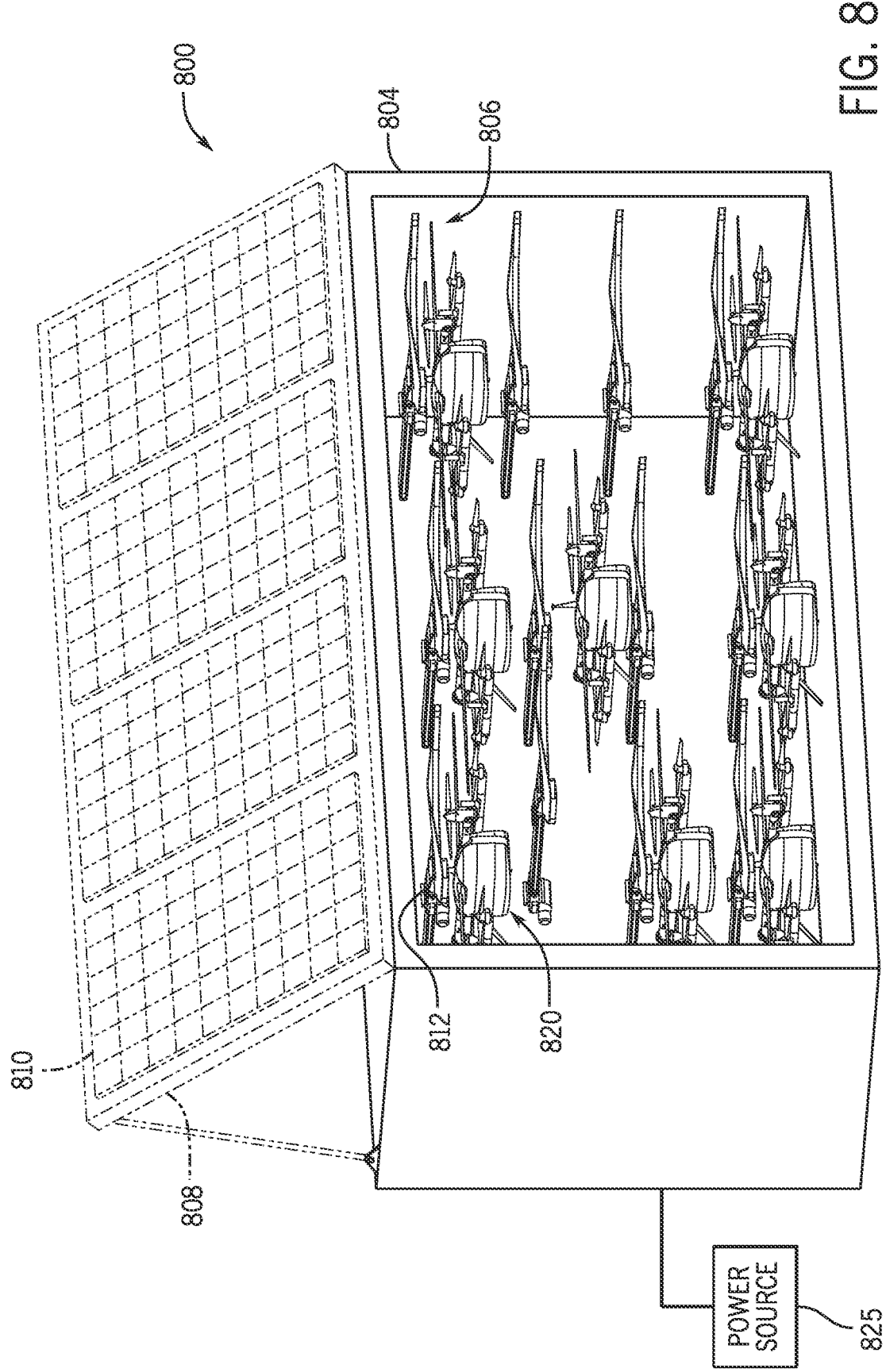
FIG. 8 depicts another example docking system.

Additional docking systems are provided herein that use primarily for the charging and/or storage of a UAV. For example, and as shown in FIG. 8, a system 800 is shown including a docking bay 804. The docking bay 804 may be a container or bay defining a storage volume 806 configured to house multiple UAV, such as any of the plurality of UAVs 820 shown in FIG. 8. In one example, the docking bay 804 may include a plurality of docking assemblies 812 that are housed within the storage volume 806. The docking assemblies 812 may be substantially analogous to the docking assembly 150 described herein; redundant explanation of which is omitted herein for clarity. The docking assemblies 812 may be packed closely together in the storage volume 806 in order to receive multiple UAVs 820 therein. The docking assemblies 812 may be configured to retrieve and store, and suspend, the UAV 820, as shown in FIG. 8. The docking assemblies 812 may further be configured to charging a respective one of the UAVs 820. In some cases, the charge may be provided via solar power. For example, the docking bay 804 is shown in FIG. 8 as including an optional a solar rack 808 having optional solar panels 810 arranged thereon. The solar panels 810 may be electrically coupled to charging element of the docking assemblies 812 in order to charge the associated UAVs 820. In other cases, other systems may be used to charge the UAV 820, such as a direct electrical connection to a power grid and/or other power source 825.

Figure 9:
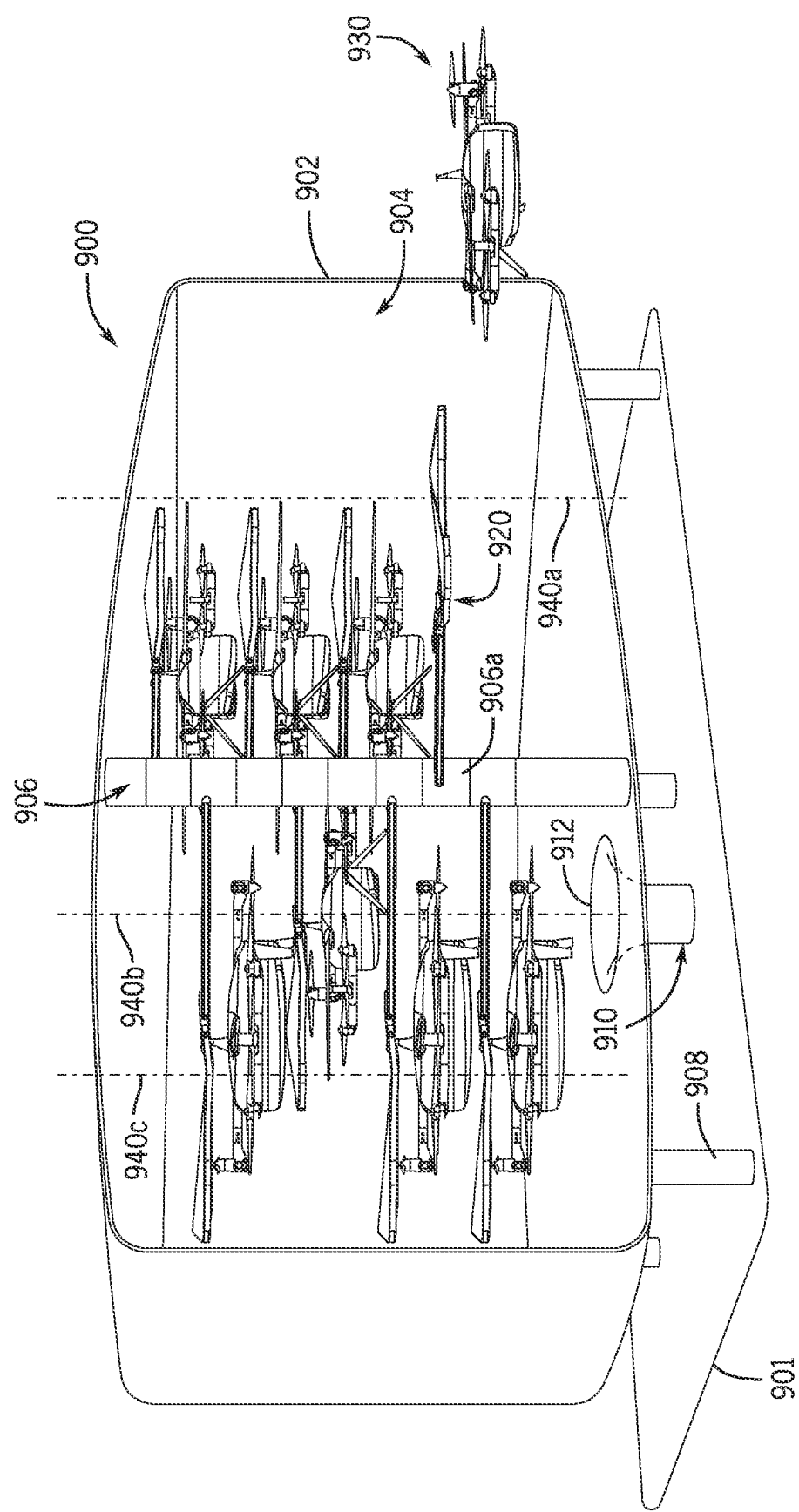
FIG. 9 depicts another example docking system.

Another example docking system 900 is depicted in FIG. 9. The system may facilitate the docking, storing, charging and loading/unloading of multiple UAVs, such as the UAV 930. For example, the system 900 may be configured to dock, store, charge and load/unload multiple UAVs by maneuvering a docked UAV, rotationally, into one or more positions in a common docking compartment suited for docking, storing, charging and/or loading/unloading. The configuration of the system 900 shown in FIG. 9 may increase the density of UAVs included in the system, which in turn may increase the efficiency of operations for charging and loading/unloading multiple UAVs at a common facility.

In the example of FIG. 9, the system 900 is shown as including an enclosure 902 that defines a docking compartment 904. The enclosure 902 may have at least one side that is open or openable to an external environment for receiving and launching UAVs into and out from the docking compartment 904. For purposes of illustration, the enclosure 902 is shown supported on a surface 901 using supports 908. In some cases, the surface 901 may be a roof of a building. In other cases, the surface 901 may be associated with a building, such as being a platform adjacent a building. In other cases, the surface 901 may be a surface of another structure. The supports 908 may hold the enclosure 902 above the surface 901. As shown in FIG. 9, the system 900 may further include a chute 910. The chute 910 may define a chute passage 912. The chute passage 912 may extend from the internal compartment 904 and through the surface 901, such as through the surface 901 and into an interior of the building (in the case of the surface 901 being a roof).

The system 900 may operate to efficiently manipulate the position of multiple UAVs relative to the chute passage 912 and/or other rotational positions within the docking compartment 904. In the example of FIG. 9A, the system 900 is shown as including a carousel 906. The carousel 906 may generally operate as an advancement mechanism of the system 900 and cause a UAV (e.g., UAV 930) to transition, rotationally, from a first captured position to a second docked position. To facilitate the foregoing, the carousel 906 may include a plurality of advancement couplings, such as the advancement coupling 906a shown in FIG. 9A. The advancement coupling 906a may be configured to move rotationally about a longitudinal axis defined by the carousel 906. Further, the advancement coupling 906a may be coupled to, and be configured to support a docking assembly, such as any of the docking assemblies described herein. In this regard, rotation of the advancement coupling 906a, or any of the advancement coupling may cause a rotation of the associated docking assembly and docked UAV.

For purposes of illustration, the advancement coupling 906a is shown coupled to a docking assembly 920. The docking assembly 920 may be substantially analogous to any of the docking assemblies described herein, and generally include a guide arm and guiding feature. For example, the docking assembly 920 may include a guiding feature configured to capture the UAV 930 and bring the UAV 930 to a first captured position. The guide arm may couple the guiding feature to the advancement mechanism or coupling 906a. In operation, the advancement coupling 906a may move the docking assembly (and UAV 930 when docked) among a plurality of rotational positions about the carousel 906. For the sake of illustration, FIG. 9 shows the docking assembly 920 at a first rotational position 940a. The first rotational position 940a may correspond to a position for receiving the UAV 930. The advancement coupling 906a may be further configured to rotate and cause the docking assembly 150 to advance to a second rotational position 940b. The second rotational position 940b may be a position at which the docking assembly 920 (and UAV 930) are substantially aligned with the chute passage 912. Accordingly, when in the second rotational position 940b, the UAV 930 may engage in one or more loading/unloading operations, as described herein with respect to FIGS. 1-3. The advancement coupling 906a may be further configured to rotate and cause the docking assembly 920 to advance to the third rotational position 940c. The third rotational position 940c may be a position within the docking compartment 904 that is configured to allow the UAV 930 to charge and/or be stored for future use.

The carousel 906 shown in FIG. 9 may include multiple advancement couplings, each coupled to a docking assembly. The system 900 may therefore include a plurality of docking assemblies each at an elevationally different height within the docking compartment 904. As such, the carousel 906 may operate to control a flow and arrangement of a plurality of UAVs about the carousel axis in order to maximize the number of UAV that may be received, charged, unloaded/loaded at a given time.

Figure 10A:
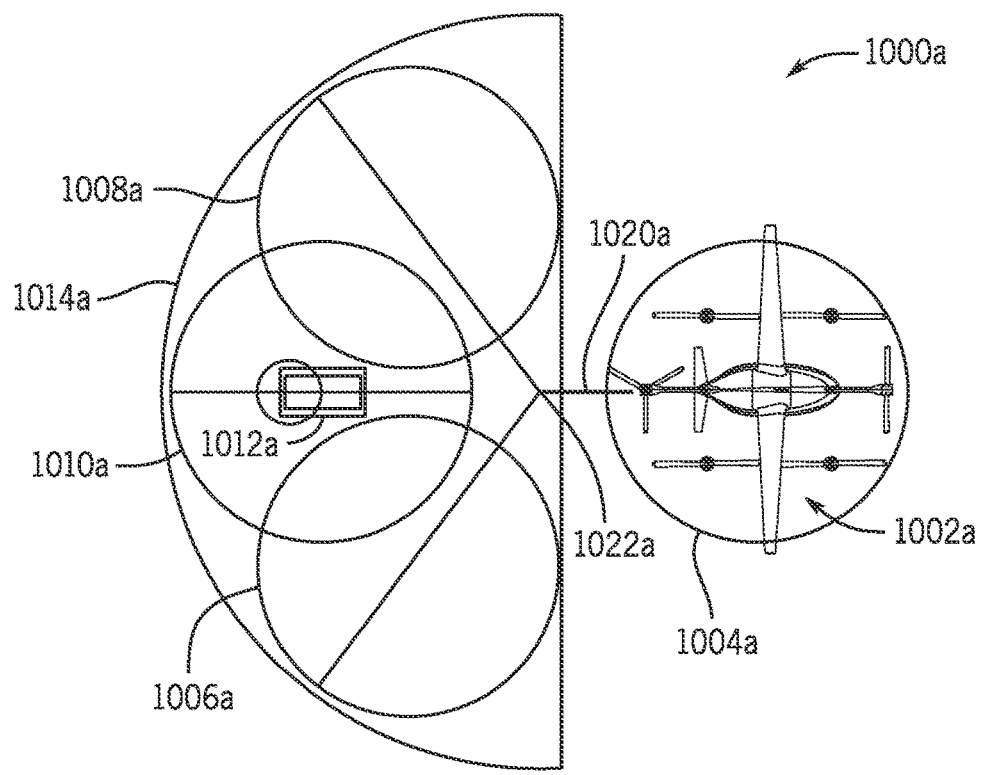
FIG. 10A depicts an example positional map for UAVs of a docking system.
Figure 10B:
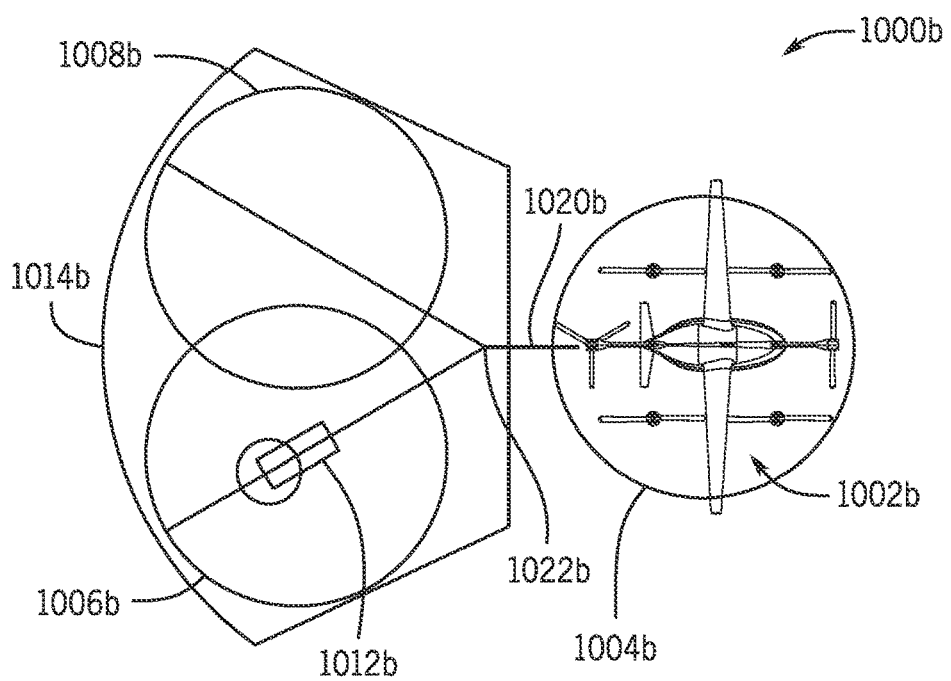
FIG. 10B depicts an example positional map for UAVs of a docking system.

It will be appreciated the carousels described herein may be used to define a variety of different positions for a UAV based on a given configuration of the docking system. FIGS. 10A and 10B depict, schematically, two positional maps for UAVs, such as for UAVs of the docking system of FIG. 9. With reference to FIG. 10A, a positional map 1000a is shown for a UAV 1002a. The positional map 1000a may depict various available positions for the UAV 1002a within a carousel-type or rotational docking system. For example, the UAV 1002a may be arrangeable at a docked position 1004a. The position of the UAV 1002a may be guided, in part, by the movements of a guide arm 1020a, which may be rotatable about a carousel axis 1022a. FIG. 10A shows the guide arm 1020a rotatable about the carousel axis 1022a such that the UAV 1002a may be stationed at variety of different positions with a docking compartment region 1014a. By way of illustration, the UAV 1002a may be moveable to any of a parked and charged position 1006a, a parked and charged position 1008a, a loading position 1010a, and/or other position. In the loading position 1010a, the UAV 1002a may lower and raise a secondary UAV 1012a (e.g., through a chute passage 912 of FIG. 9). The parked and charged positions 1006a, 1008b may facilitate the storing and charging of the UAV 1002a.

With reference to FIG. 10B, a positional map 1000b is shown for a UAV 1002b. The positional map 1000b may depict different available positions for the UAV 1002b within a carousel-type docking system. For example, the UAV 1002b may be arrangeable at a docked position 1004b. The position of the UAV 1002b may be guided, in part, by the movements of a guide arm 1020b, which may be rotatable about a carousel axis 1022b. FIG. 10B shows the guide arm 1020b rotatable about the carousel axis 1022b such that the UAV 1002b may be stationed at variety of different positions with a docking compartment region 1014b. By way of illustration, the UAV 1002b may be moveable to any of a parked and charged position 1006a, a parked and charged position 1008a. The parked and charged positions 1006a, 1008b may facilitate the storing and charging of the UAV 1002b.

Figure 11:
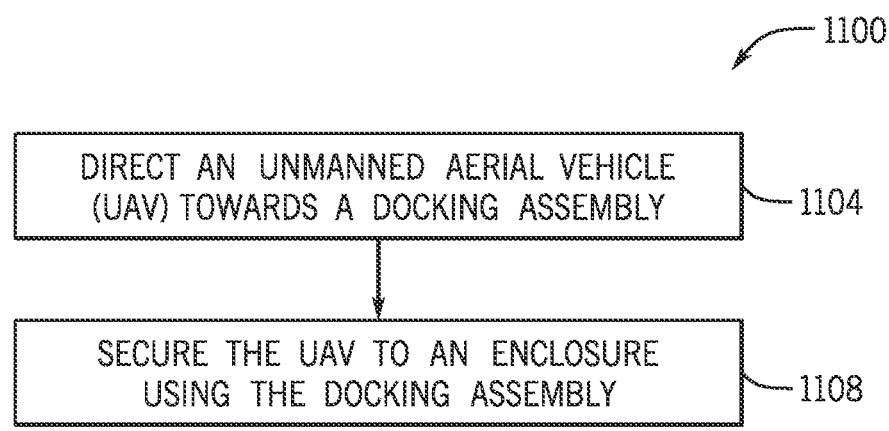
FIG. 11 depicts a flow diagram of a method to mount a UAV, such as the UAV of FIG. 1.

To facilitate the reader's understanding of the various functionalities of the examples discussed herein, reference is now made to the flow diagram in FIG. 11, which illustrates process 1100. While specific steps (and orders of steps) of the methods presented herein have been illustrated and will be discussed, other methods (including more, fewer, or different steps than those illustrated) consistent with the teachings presented herein are also envisioned and encompassed with the present disclosure.

At operation 1104, a UAV is directed towards a docking assembly. For example, and with reference to FIGS. 2 and 5A, the UAV 180 is directed toward the docking assembly 150. The docking assembly 150 may be at least partially within a housing 114 that defines an enclosure. The UAV 180 may be directed toward the docking assembly 150 such that the docking feature 191 of the UAV 180 travels adjacent the guiding feature 160. The UAV 180 may progress along a docking path of the guiding feature 160 defined by bumpers 162a, 162b. The docking path may progressively narrow in order to constrain the lateral movements of the UAV 180 as the UAV 180 moves toward the docking housing 114.

At operation 1108, the UAV is secured to the enclosure using the docking assembly. For example, and with reference to FIGS. 2 and 5A, the UAV 180 may continue to move toward the docking assembly 150 until the UAV 180 reaches an end of the docking path. At the end of the docking path, the UAV 180 is secured to the docking assembly 150. For example, the docking feature 191 may be engaged with the receiving guide 159 of the guide arm 156 in manner that allows the UAV to be suspended from the docking assembly 150. The docking assembly 150 may be secured to the underside of the top wall 115 of the docking housing 114, for example, via the mounting structure 153. As such, the UAV 180 may be secured to the docking housing 114 by the docking assembly 150.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A docking system for an unmanned aerial vehicle (UAV), the docking system comprising:
    a docking housing; and
    a docking assembly coupled to the docking housing, the docking assembly comprising:
        a bottom;
        a guiding feature on the bottom and configured to receive a docking feature on a top of the UAV and direct the UAV toward a first captured position, wherein the guiding feature defines an alignment feature to encourage lateral movement of the UAV toward the first captured position, wherein the alignment feature defines a tapered docking path along a length thereof; and
        an advancement assembly operatively coupled with the guiding feature and configured to move the UAV from the first captured position to a second docked position.

2. The docking system of claim 1, wherein the advancement assembly is configured to move the UAV from the first captured position to the second docked position while the UAV is suspended from the docking assembly via the docking feature.

3. The docking system of claim 1, wherein
    the docking assembly further comprises a guide arm coupling the advancement assembly and the guiding feature, and
    the advancement assembly is configured to move the guide arm and cause the guide arm to establish the UAV at the first captured position or the second docked position.

4. The docking system of claim 3, wherein the advancement assembly is configured to move the guide arm one or both of linearly or rotationally and cause the UAV to transition from the first captured position to the second docked position.

5. The docking system of claim 1, further comprising a charging assembly electrically coupled to a power source, wherein, in the second docked position, the UAV electrically couples to the charging assembly to charge the UAV.

6. The docking system of claim 1, further comprising a thermal system configured to thermally couple with the UAV, when the UAV is in the second docked position.

7. The docking system of claim 1, wherein a single continuous region of contact is defined between the UAV and the advancement assembly.

8. The docking system of claim 1, wherein the guiding feature comprises a guide surface on the bottom of the docking assembly, and wherein the guide surface is configured to direct the UAV toward the first captured position.

9. A docking system for unmanned aerial vehicles comprising:
- a docking housing defining a docking compartment; and
- a docking assembly coupled to the docking housing and configured to suspend an unmanned aerial vehicle (UAV) within the docking compartment such that the UAV is spaced apart from one or more walls of the docking housing, the docking assembly comprising:
  - a bottom;
  - a guiding feature on the bottom and configured to receive a docking feature on a top of the UAV, wherein the guiding feature defines an alignment feature to encourage lateral movement of the UAV toward the first capture position, wherein the alignment feature defines a tapered docking path along a length thereof; and
  - an advancement assembly configured to move the UAV to a docked position.

10. The docking system of claim 9, wherein the docking housing comprises a top wall, a bottom wall, a back wall, and two sidewalls, wherein the top wall, the bottom wall, the back wall, and the two sidewalls cooperate to define the docking compartment.

11. The docking system of claim 9, wherein the docking assembly further comprises at least one of:
- a charging assembly electrically coupled to a power source and configured to electrically couple to the UAV to transfer power to the UAV, or
- a thermal system configured to thermal couple with the UAV, when the UAV is in a docked position, and transfer heat therebetween.

12. The docking system of claim 9, wherein the advancement assembly defines a pathway through the docking housing to guide the UAV from a first captured position to a second docked position.

13. The docking system of claim 12, wherein the guiding feature defines an alignment path to encourage the UAV to engage with the advancement assembly and reach the first captured position.

14. The docking system of claim 13, wherein a portion of the guiding feature is movable relative to the docking housing linearly and/or rotationally.

15. The docking system of claim 12, wherein the advancement assembly comprises a carousel configured to rotationally advance the UAV between the first captured position and the second docked position.

16. The docking system of claim 9, wherein the docking housing is configured to be secured to an external portion of a building.

17. A method to mount an unmanned aerial vehicle to a docking system comprising a docking housing and a docking assembly coupled to the docking housing, the docking assembly comprising a guiding feature and an advancement assembly, the method comprising:
- receiving, by the guiding feature on a bottom of the docking assembly, a docking feature on a top of an unmanned aerial vehicle (UAV);
- directing, by the guiding feature, the UAV towards the advancement assembly; and
- securing the UAV using the advancement assembly.

18. The method of claim 17, further comprising influencing lateral movements of the UAV and encouraging the UAV to a first captured position.

19. The method of claim 18, further comprising advancing the UAV from the first captured position to a second docked position, rotationally and/or linearly.

20. The method of claim 19, in the second docked position, at least one of
- charging the UAV, or
- transferring heat between the UAV and the docking assembly.

21. A docking system for unmanned aerial vehicles comprising:
- a docking housing defining a docking compartment; and
- a docking assembly coupled to the docking housing and configured to suspend an unmanned aerial vehicle (UAV) within the docking compartment such that the UAV is spaced apart from one or more walls of the docking housing, the docking assembly comprising:
  - a bottom;
  - a guiding feature on the bottom and configured to receive a docking feature on a top of the UAV; and
  - an advancement assembly configured to move the UAV to a docked position; and
- a loading duct extending from a bottom wall of the docking housing, wherein the loading duct is configured to receive accessories coupled to the UAV therein.

* * * * *